United States Patent
Tamaki et al.

(10) Patent No.: US 10,845,629 B2
(45) Date of Patent: Nov. 24, 2020

(54) DISPLAY DEVICE

(71) Applicant: Japan Display Inc., Tokyo (JP)

(72) Inventors: Masaya Tamaki, Tokyo (JP); Akihiko Saitoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/569,213

(22) Filed: Sep. 12, 2019

(65) Prior Publication Data
US 2020/0004071 A1 Jan. 2, 2020

Related U.S. Application Data

(63) Continuation of application No. 15/460,506, filed on Mar. 16, 2017, now Pat. No. 10,459,262.

(30) Foreign Application Priority Data

Mar. 17, 2016 (JP) ................. 2016-053887

(51) Int. Cl.
*G02F 1/133* (2006.01)
*G02F 1/1333* (2006.01)
(Continued)

(52) U.S. Cl.
CPC ...... *G02F 1/13306* (2013.01); *G02F 1/13452* (2013.01); *G02F 1/133345* (2013.01);
(Continued)

(58) Field of Classification Search
CPC ..... G02F 1/13452; G02F 2001/133388; G02F 2201/123; G09G 2310/0281; G09G 2300/0413; G09G 2310/0232
See application file for complete search history.

(56) References Cited

U.S. PATENT DOCUMENTS

2004/0189571 A1 9/2004 Yo
2008/0224990 A1 9/2008 Shimodaira
(Continued)

FOREIGN PATENT DOCUMENTS

CN 102681247 A 9/2012
EP 2 466 370 A1 6/2012
(Continued)

OTHER PUBLICATIONS

Chinese Office Action dated Mar. 9, 2020 for the corresponding Chinese application No. 201710158584.9, with English machine translation provided by Global Dossier.
(Continued)

*Primary Examiner* — Jessica M Merlin
(74) *Attorney, Agent, or Firm* — Michael Best & Friedrich LLP

(57) ABSTRACT

According to one embodiment, a display device includes a driver, a first pixel circuit disposed apart from the driver in plan view but electrically connected to the driver, a second pixel circuit separated further from the driver than the first pixel circuit in plan view but electrically connected to the driver, a first pixel electrode overlapping the driver in plan view, a second pixel electrode overlapping the first pixel circuit in plan view, a first relay line electrically connecting the first pixel circuit and the first pixel electrode to each other, and a second relay line electrically connecting the second pixel circuit and the second pixel electrode to each other.

20 Claims, 26 Drawing Sheets

(51) Int. Cl.
*G02F 1/1335* (2006.01)
*G02F 1/1345* (2006.01)
*G09G 3/36* (2006.01)

(52) U.S. Cl.
CPC .. *G02F 1/133504* (2013.01); *G02F 1/133512* (2013.01); *G09G 3/3607* (2013.01); *G09G 3/3651* (2013.01); *G02F 2001/133388* (2013.01); *G02F 2201/123* (2013.01); *G09G 2300/026* (2013.01); *G09G 2300/0413* (2013.01); *G09G 2300/0426* (2013.01); *G09G 2300/0456* (2013.01); *G09G 2300/0857* (2013.01); *G09G 2300/0861* (2013.01); *G09G 2310/0232* (2013.01); *G09G 2310/0281* (2013.01)

(56) References Cited

U.S. PATENT DOCUMENTS

| | | |
|---|---|---|
| 2010/0079691 A1 | 4/2010 | Yoshii |
| 2011/0248968 A1 | 10/2011 | Suh |
| 2012/0250158 A1 | 10/2012 | Tamaki et al. |
| 2012/0307176 A1 | 12/2012 | Tanaka |
| 2014/0184479 A1 | 7/2014 | Wu |
| 2014/0253843 A1 | 9/2014 | Kanno et al. |
| 2015/0310801 A1 | 10/2015 | Lin et al. |
| 2017/0154943 A1 | 6/2017 | Yang et al. |

FOREIGN PATENT DOCUMENTS

| | | |
|---|---|---|
| JP | 2002-072188 A | 3/2002 |
| JP | 2015-215536 A | 12/2005 |
| JP | 2010-048918 A | 3/2010 |
| JP | 2012-247662 A | 12/2012 |
| JP | 2015-34998 A | 2/2015 |

OTHER PUBLICATIONS

Japanese Office Action dated Dec. 24, 2019 for the corresponding Japanese Application No. 2016-053887, with machine translation provided by Global Dossier.

Chinese Office Action dated Jun. 29, 2020 for the corresponding Chinese Patent Application No. 201710158584.9, with English translation.

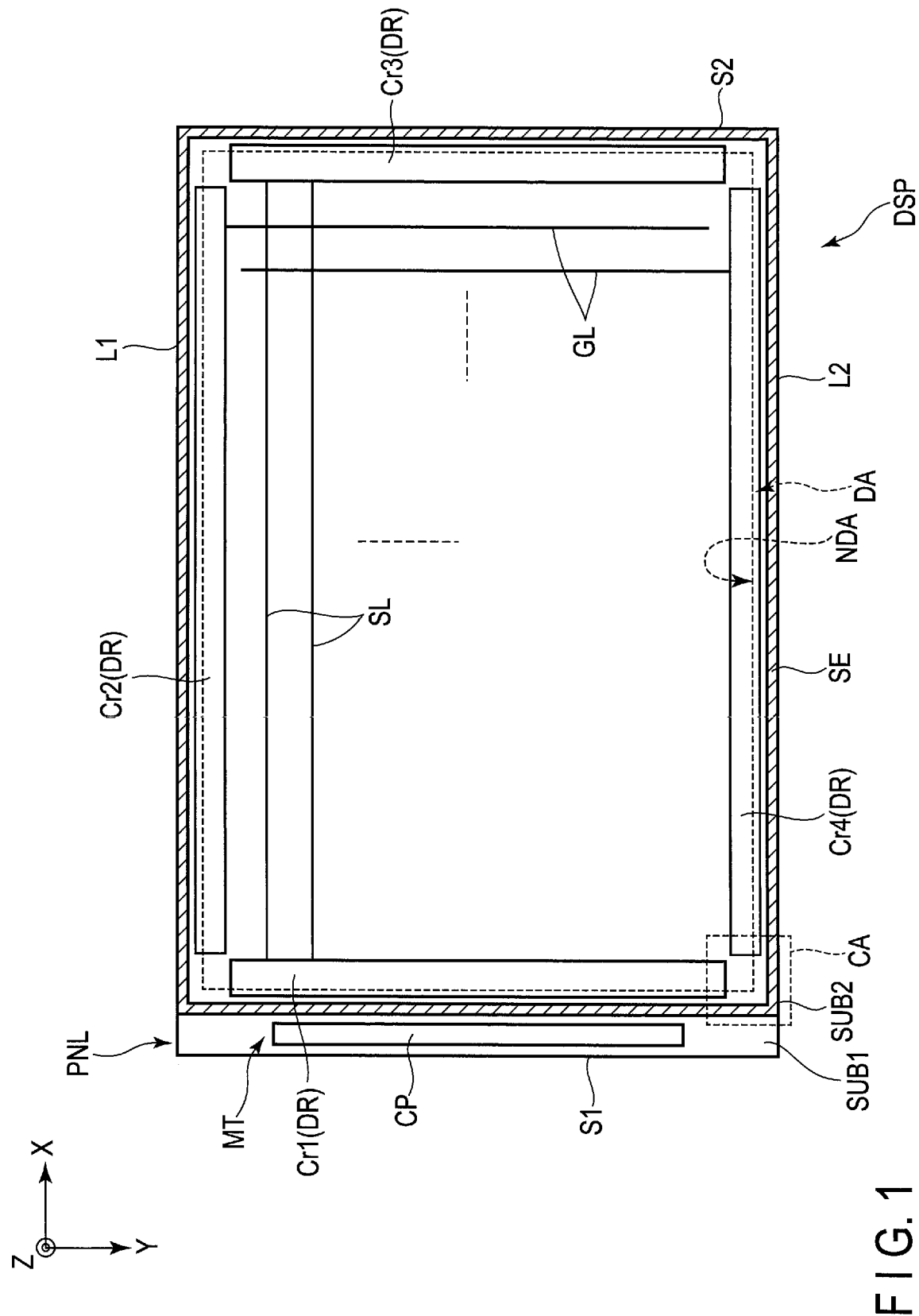
F I G. 1

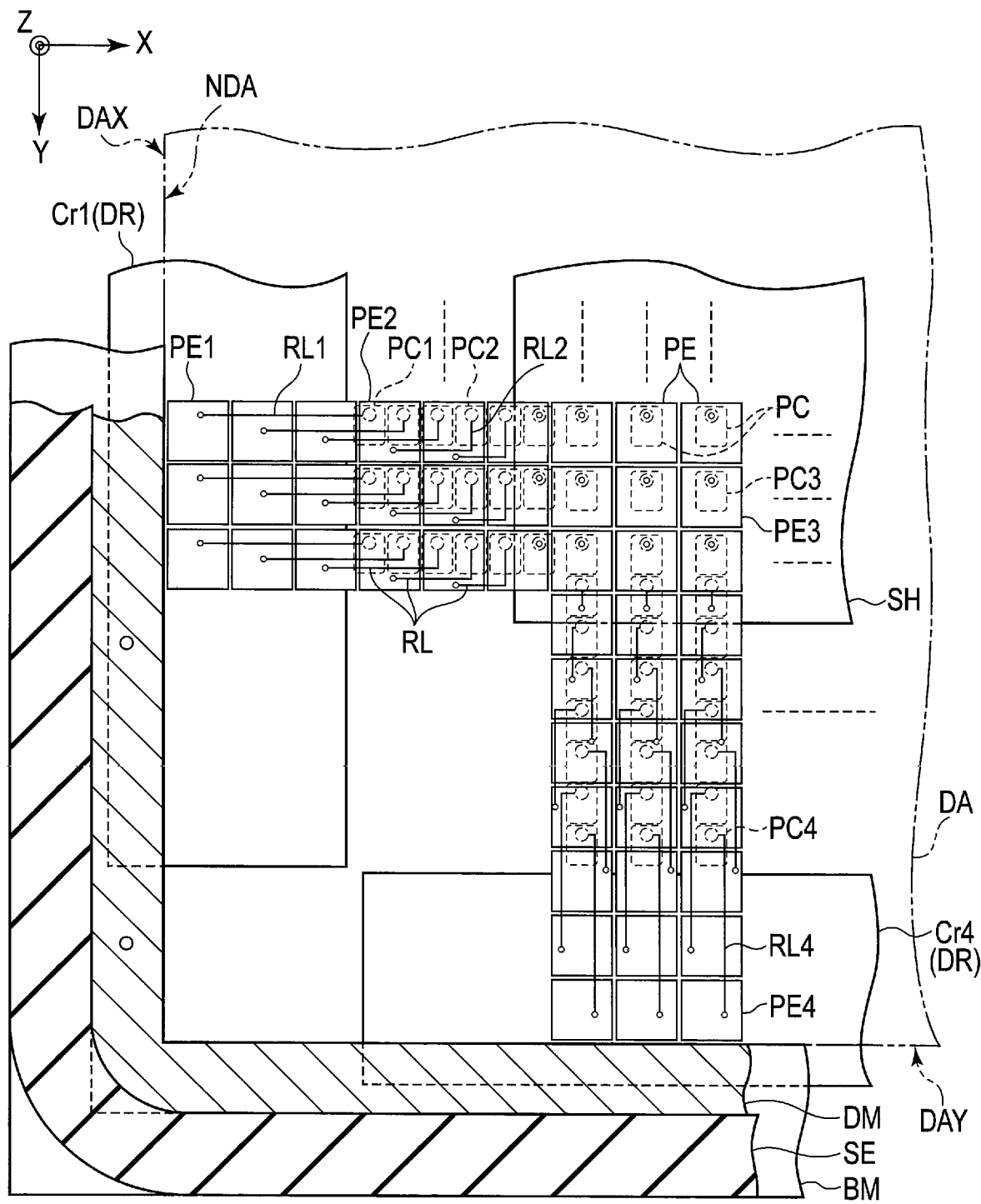
F I G. 2

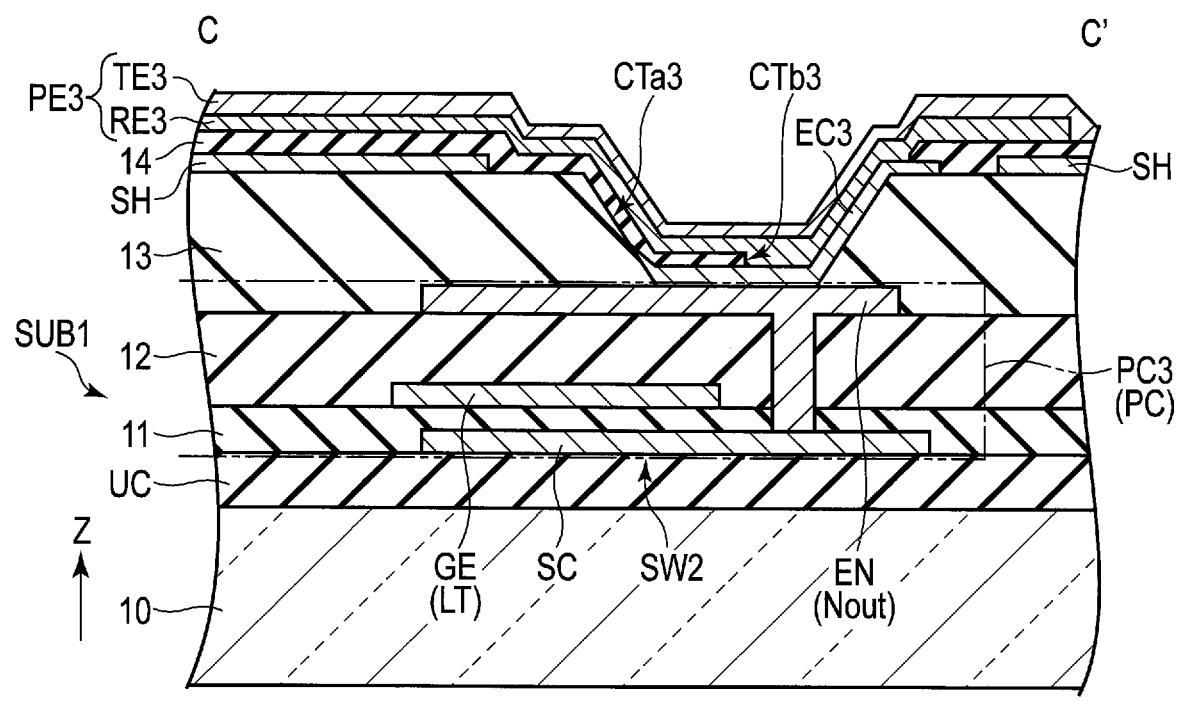
F I G. 6

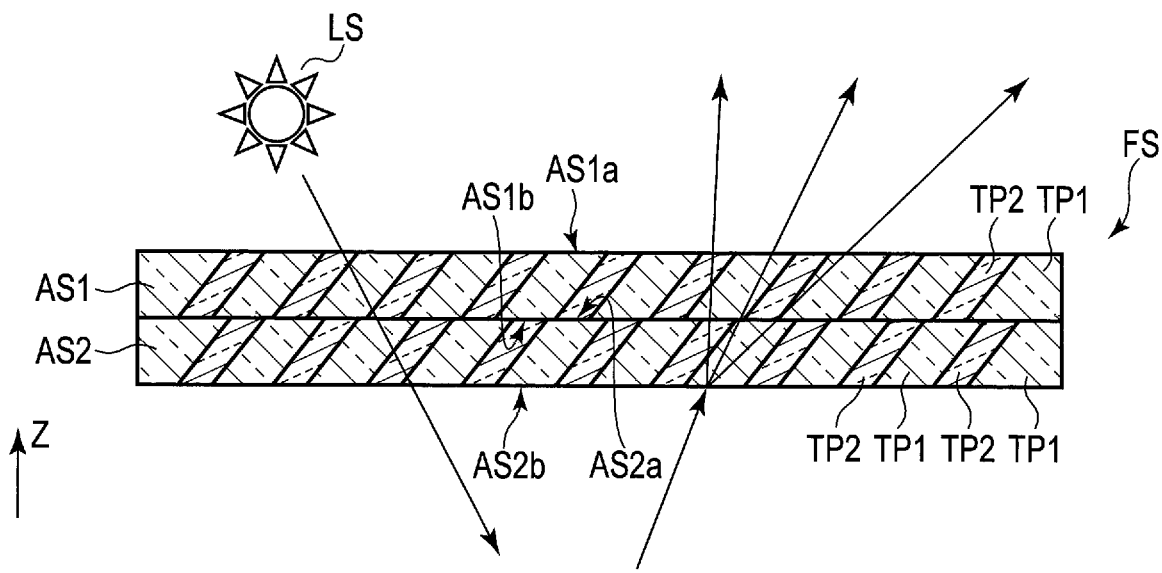
F I G. 7B
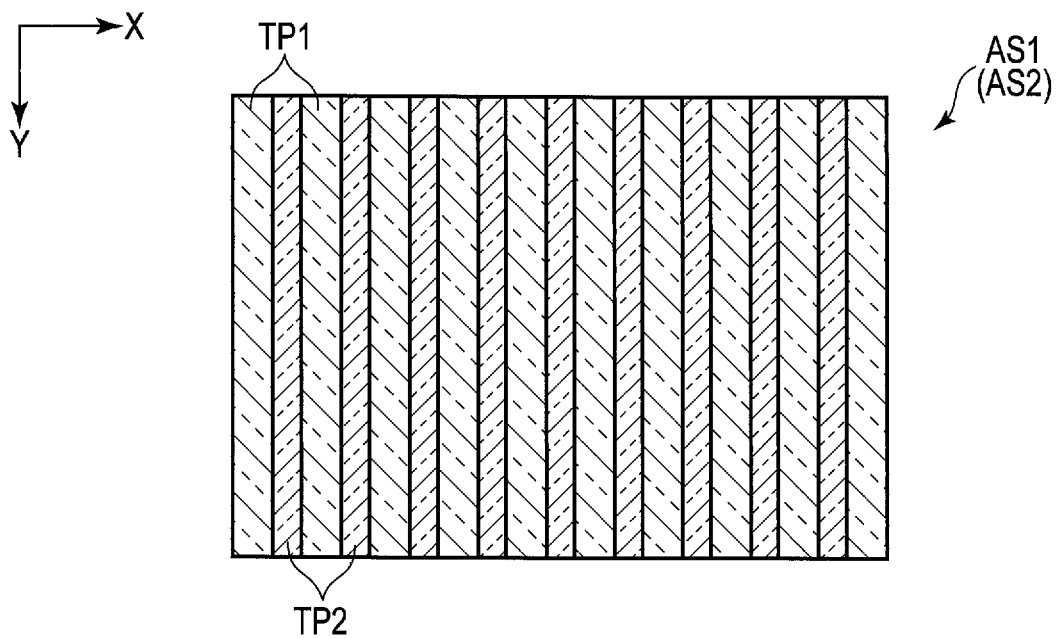
F I G. 7C

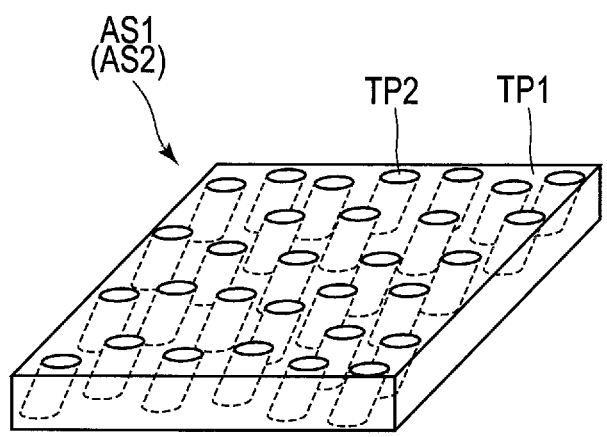
F I G. 7D
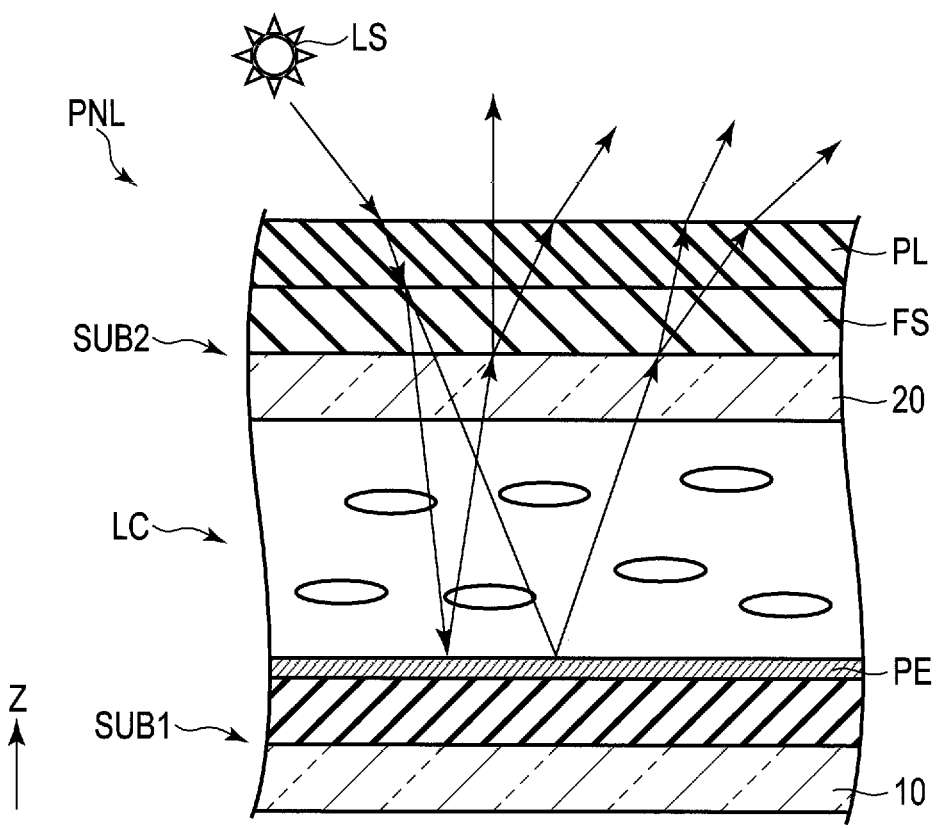
F I G. 7E

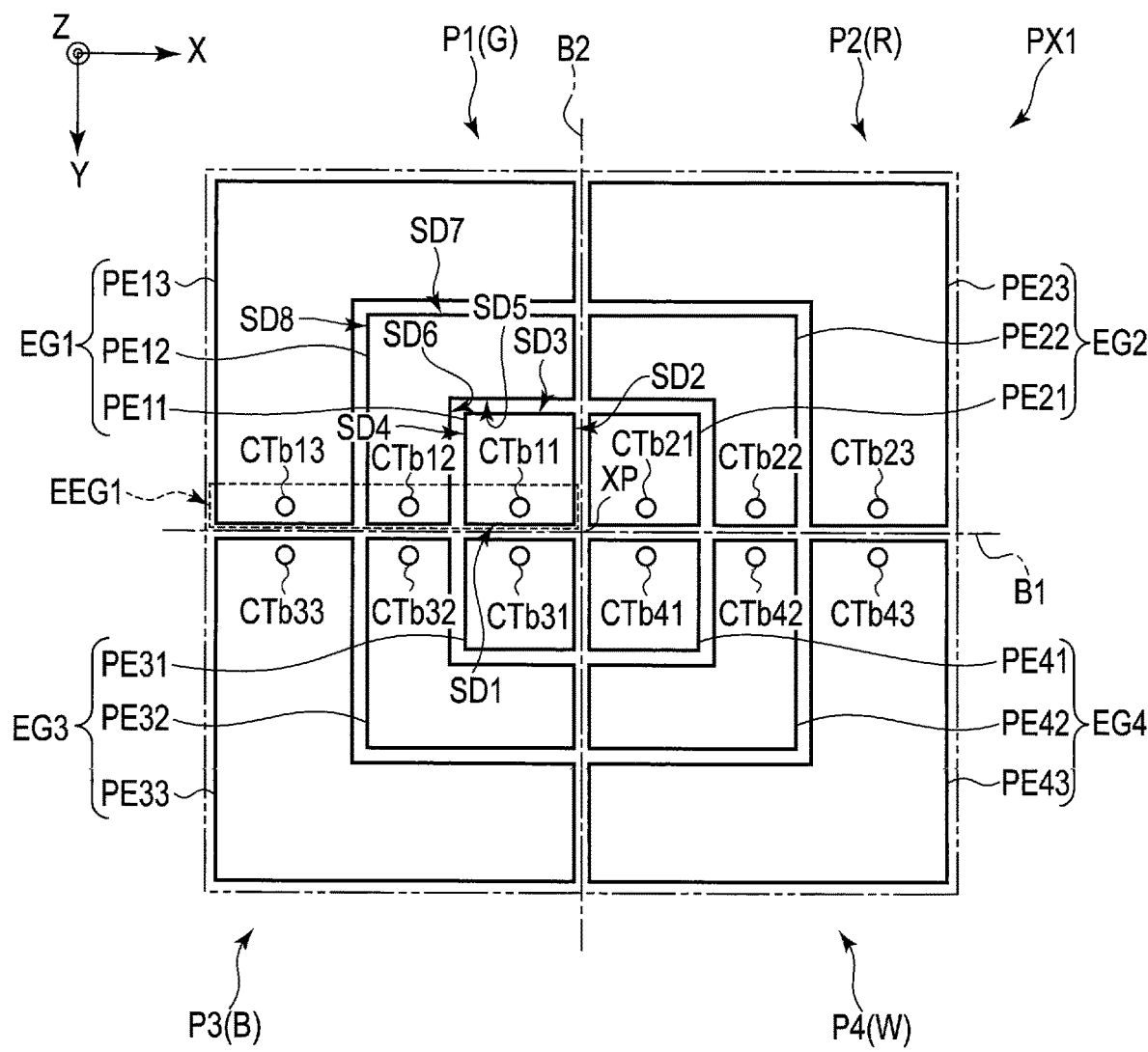
F I G. 12

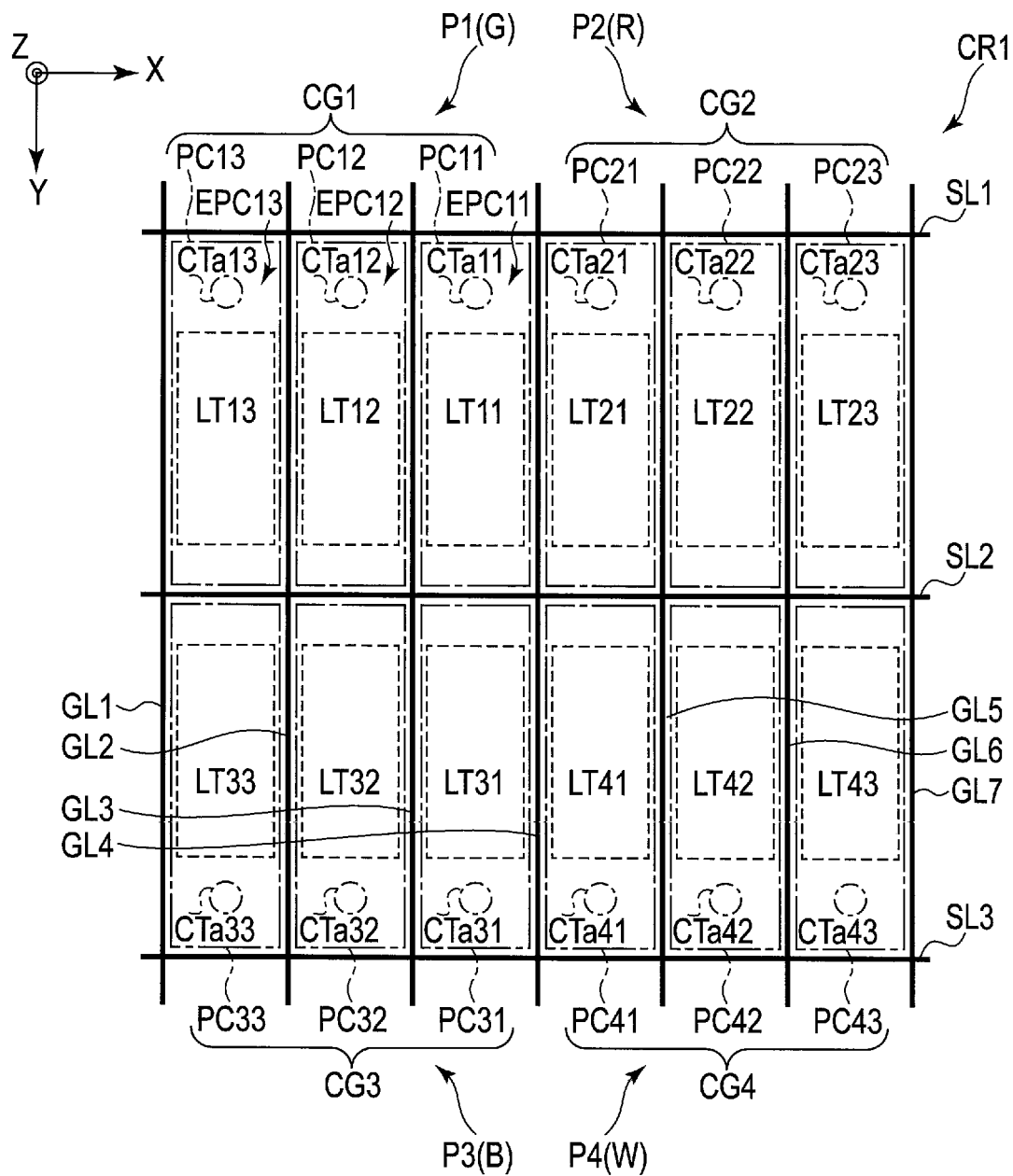
F I G. 13

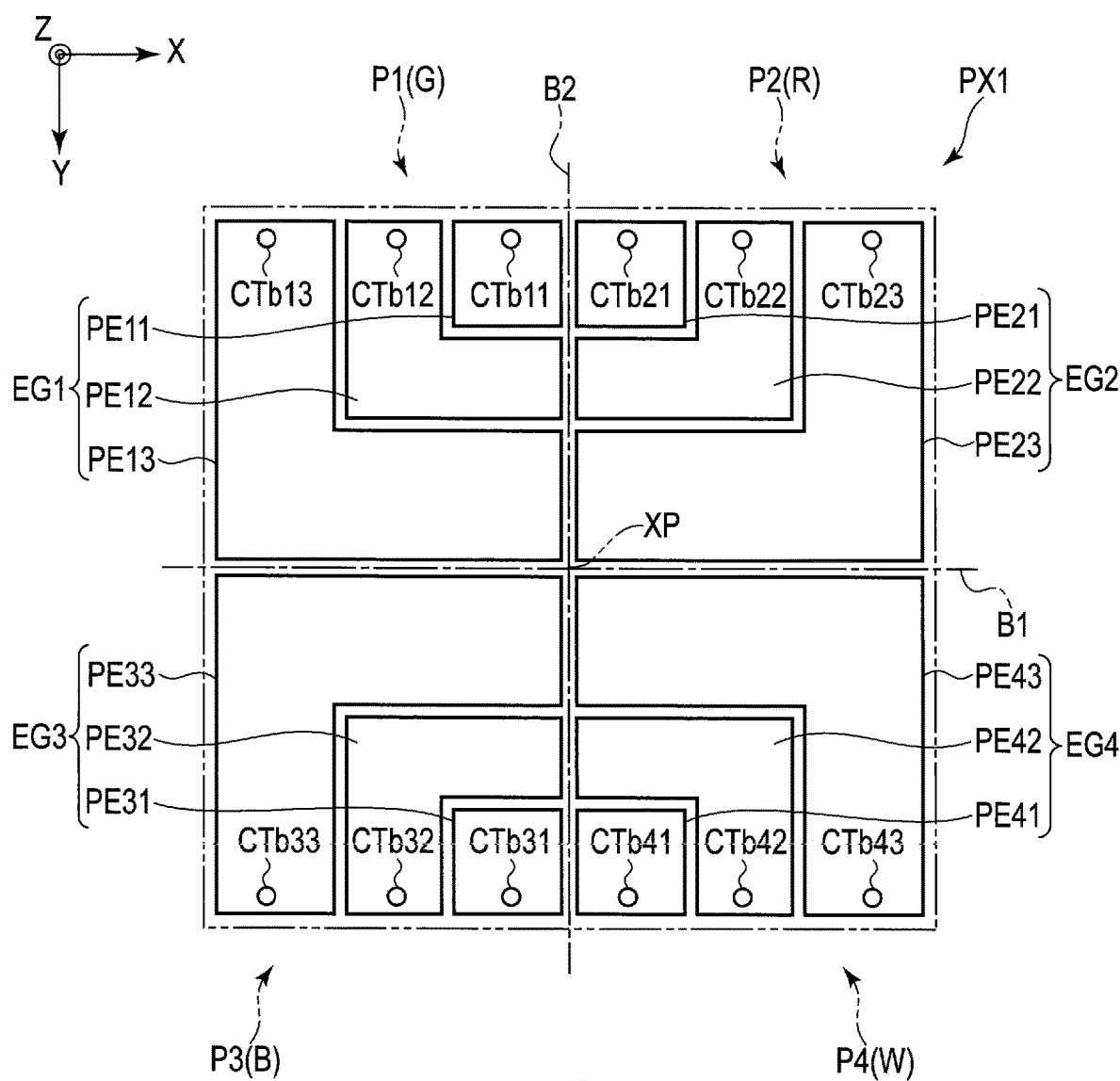
F I G. 17

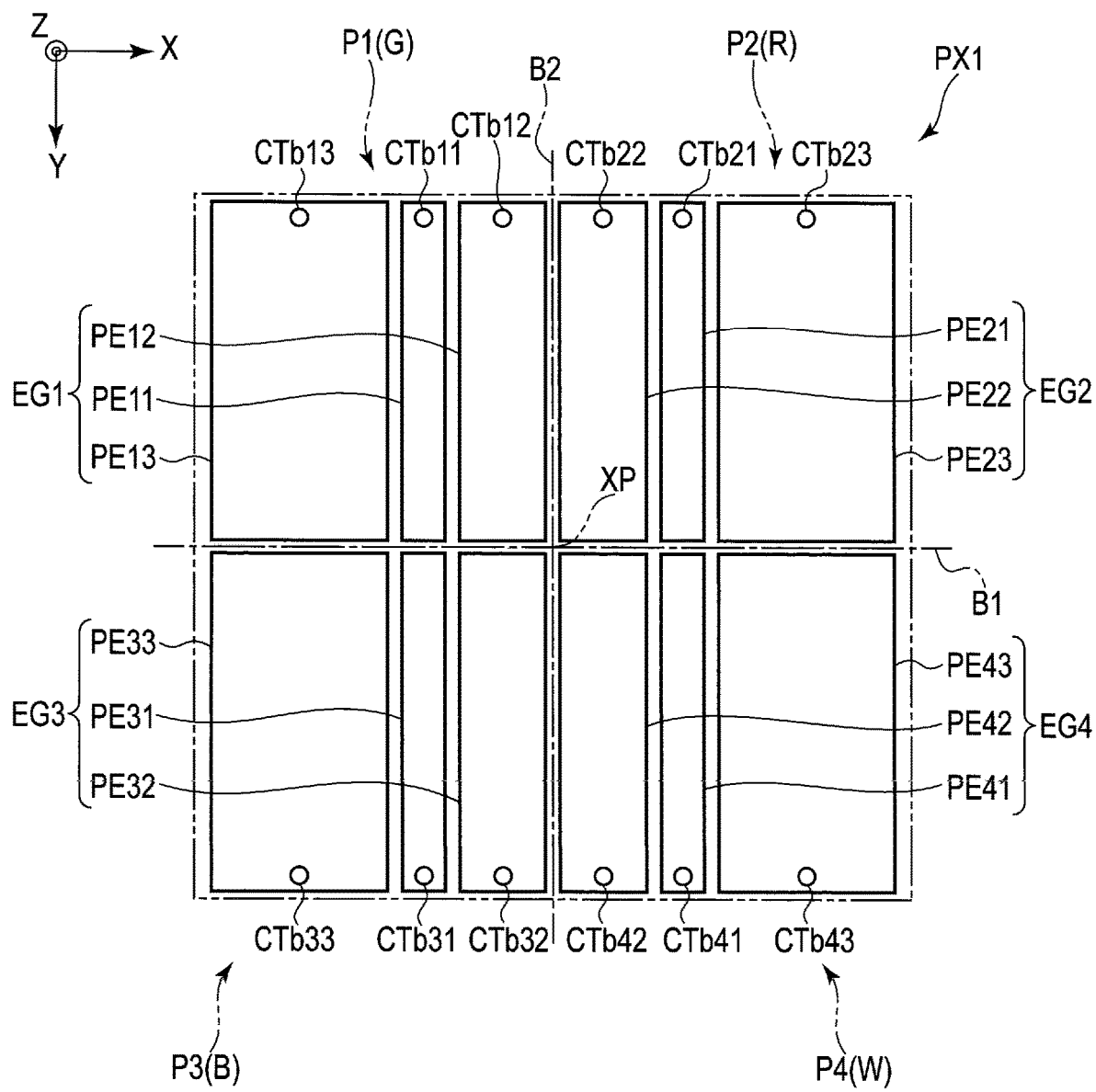
F I G. 18

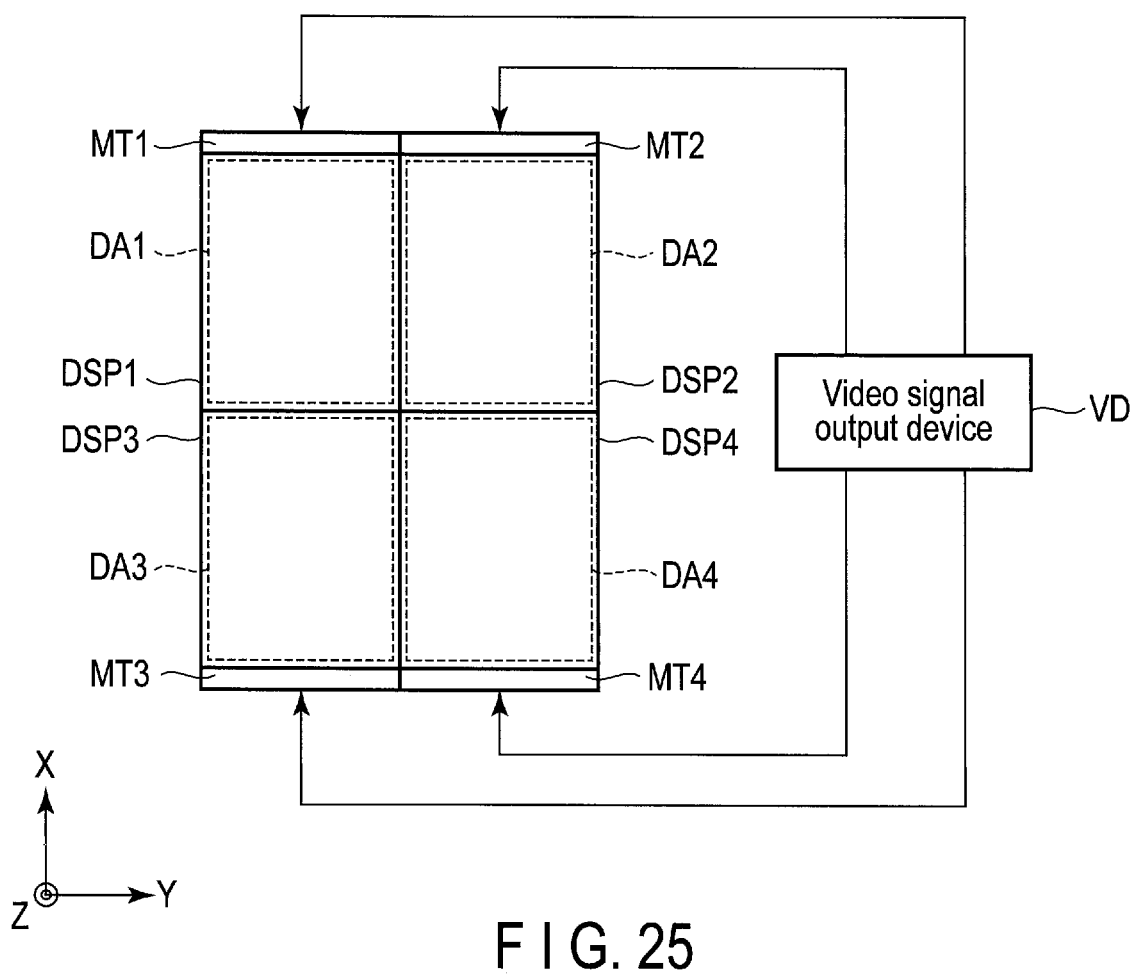
F I G. 25

DISPLAY DEVICE

CROSS-REFERENCE TO RELATED APPLICATIONS

The present Application is a Continuation Application of U.S. patent application Ser. No. 15/460,506 filed Mar. 16, 2017, which is is based upon and claims the benefit of priority from Japanese Patent Application No. 2016-053887, filed Mar. 17, 2016, the entire contents of which are incorporated herein by reference.

FIELD

Embodiments described herein relate generally to a display device.

BACKGROUND

In the field of signage display devices, the multi-display system which displays an image by a plurality of display devices arranged as tiles for scale-up is known. Note that the display devices each comprise a frame light-shielding film in a frame-like non-display area (frame), which shades the drivers, dummy electrodes and the like. In the above-described multi-display system, a display image may be divided by the frames between adjacent display devices. There is a demand for narrowing the frames of the display devices in order to improve the display quality.

BRIEF DESCRIPTION OF THE DRAWINGS

FIG. 1 is a plan view showing an example of a configuration of a display device DSP.

FIG. 2 is an enlarged plan view showing an area CA of the display device DSP shown in FIG. 1.

FIG. 6 is a cross section of the first substrate SUB1 taken along line C-C' in FIG. 3.

FIG. 7B is a cross section of a scattering layer FS shown in FIG. 7A.

FIG. 7C is a plan view of an anisotropic scattering layer AS1 shown in FIG. 7B.

FIG. 7D is a perspective view showing another example of the anisotropic scattering layer AS1 shown in FIG. 7A.

FIG. 7E is a cross section of the display panel PNL, which illustrates an example of the optical path of incident light when dispersion in the scattering layer FS is isotropic.

FIG. 12 is a plan view showing a configuration example of electrode groups EG1 to EG4 in the main pixel PX1 shown in FIG. 10.

FIG. 13 is a schematic diagram showing a configuration example of circuit groups CG1 to CG4 in the main pixel circuit CR1 shown in FIG. 10.

FIG. 17 is a diagram showing the second modified example of the structure of the electrode groups EG1 to EG4 shown in FIG. 12.

FIG. 18 is a diagram showing the third modified example of the structure of the electrode groups EG1 to EG4 shown in FIG. 12.

FIG. 25 is a diagram showing a configuration example of a multi-display system.

DETAILED DESCRIPTION

Figure 3:
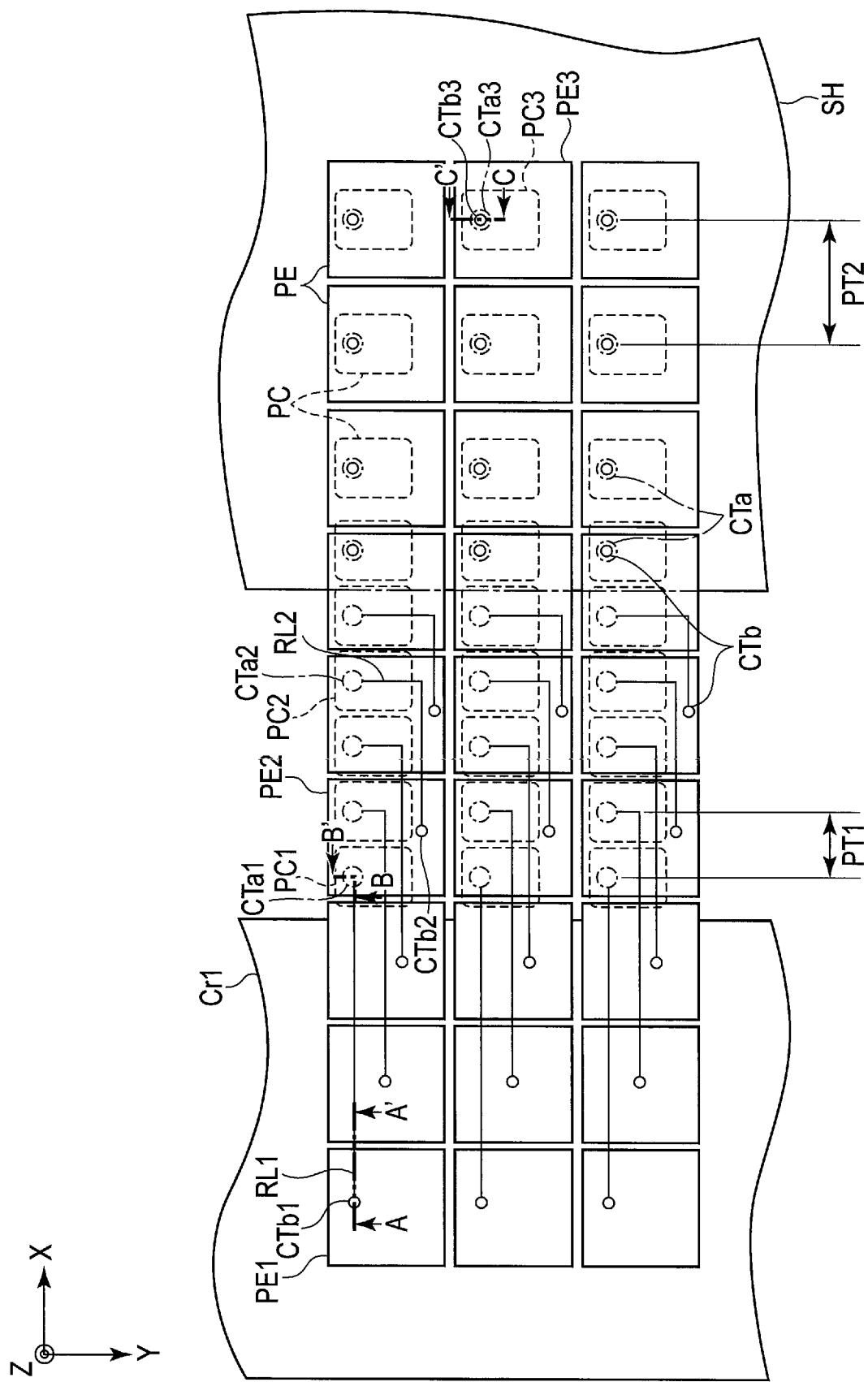
FIG. 3 is an enlarged plan view showing a region including pixel electrodes PE1 and PE3 shown in FIG. 2.

In general, according to one embodiment, a display device comprises: a driver; a first pixel circuit disposed apart from the driver as seen in plan view but electrically connected to the driver; a second pixel circuit separated further from the driver than the first pixel circuit as seen in plan view but electrically connected to the driver; a first pixel electrode overlapping the driver as seen in plan view; a second pixel electrode overlapping the first pixel circuit as seen in plan view; a first relay line electrically connecting the first pixel circuit and the first pixel electrode to each other; and a second relay line electrically connecting the second pixel circuit and the second pixel electrode to each other.

According to another embodiment, a display device comprises: a driver; a first circuit group including first to third pixel circuits each electrically connected to the driver, and disposed apart from the driver as seen in plan view; a first electrode group including a first pixel electrode, a second pixel electrode greater in area than the first pixel electrode and a third pixel electrode greater in area than the second pixel electrode, and overlapping the driver as seen in plan view; a first relay line electrically connecting the first pixel circuit and the first pixel electrode to each other; a second relay line electrically connecting the second pixel circuit and the second pixel electrode to each other; and a third relay line electrically connecting the third pixel circuit and the third pixel electrode to each other.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

With respect to each of the embodiments, a reflective liquid crystal display device will be described as an example of the display device. The reflective liquid crystal display device displays images by modulating the optical characteristics of its liquid crystal layer to selectively reflect incident light from the display surface side, such as external light and fill light. The embodiments are not limited to the reflective type, but may be a transflective display device which has both functions of the transmissive type, which selectively transmits incident light from the opposite side to the display surface and the reflective type. Further, the function of selectively reflecting or transmitting incident light is not limited to the liquid crystal mode, but it may be achieved by other modes such as micro-electro-mechanical-systems (MEMS) and an electrophoretic mode.

Embodiment

FIG. 1 is a plan view showing a configuration example of a display device DSP.

In the drawing, a first direction X and a second direction Y cross each other, for example, orthogonally. A third direction Z crosses the first direction X and the second direction Y, for example, orthogonally to the first direction X and the second direction Y. Further, viewing the display device DSP and the display panel PNL from the normal direction orthogonal to the X-Y plane which is defined by the first direction X and the second direction Y is referred to as a plan view.

The display device DSP includes, for example, a display panel PNL, a driver DR and the like. In this example, the display panel PNL is formed into a rectangular shape comprising a pair of long sides L1 and L2 along the first direction X and a pair of short sides S1 and S2 along the second direction Y, but the shape is not limited to that of the example illustrated, and may be other polygons, circles, elliptical or the like.

The liquid crystal display panel PNL includes a first substrate SUB1 and a second substrate SUB2. The first substrate SUB1 and the second substrate SUB2 are adhered to each other with a sealant SE. The sealant SE is placed along each of the short sides S1 and S2 and the long sides L1 and L2. The display panel PNL includes a display area DA inside the area surrounded by the sealant SE, for image display. The display panel PNL includes a non-display area NDA outside the display area DA. The display area DA comprises a plurality of pixel electrodes, pixel circuits and the like, as will be described later. The first substrate SUB1 comprises a plurality of signal lines SL, scanning lines GL, wiring lines and power lines for supplying various voltages (not shown), etc. in the display area DA. The signal lines SL are each provided along the first direction X. The scanning lines GL are each provided along the second direction Y.

The driver DR has a function of driving the pixel electrodes by supplying various voltages including video signals, respectively, according to the respective pixel circuits. The driver DR comprises peripheral circuits Cr1 to Cr4 located in the region surrounded by the sealant SE. The peripheral circuits Cr1 to Cr4 are arranged on the first substrate SUB1 so as to be located continuously from the non-display area NDA over to the peripheral portion within the display area DA. For example, the peripheral circuit Cr1 is disposed along the short side S1 and comprises a signal line driving circuit and the like. The peripheral circuit Cr2 is disposed along the long side L1 and comprises a scanning line driving circuit, a polarity inversion circuit, a common drive circuit, etc. The peripheral circuit Cr3 is disposed along the short side S2 and comprises a protective circuit, etc. The peripheral circuit Cr4 is disposed along the long side L2 and comprises a scanning line driving circuit, a polarity inversion circuit, a common drive circuit, etc. The signal lines SL are electrically connected to the peripheral circuits Cr1 and Cr3. The scanning lines GL are electrically connected to the peripheral circuit Cr2 or Cr4. The driver DR may further comprise a drive timing generation circuit, a power supply circuit, etc.

In the example illustrated, the display panel PNL comprises a drive IC chip CP in its non-display area NDA. The drive IC chip CP is mounted in a mounting portion MT of the first substrate SUB1 disposed along the short side S1. The drive IC chip CP comprises part of various circuits which constitute the driver DR.

FIG. 2 is an enlarged plan view showing an area CA of the display device DSP shown in FIG. 1. In the example illustrated, the display device DSP is the so-called memory-in-pixel (MIP) drive-mode display device which comprises in the display area DA a plurality of static random access memories (SRAMs) as memories to store data regarding display of each pixel. In the drawing, each pixel circuit PC is equivalent to a SRAM, and each pixel electrode PE is equivalent to the display region of each pixel. The memories are not limited to SRAMs, but some other structure such as dynamic random access memories (DRAMs) may be applied.

In the display area DA, a plurality of pixel circuits PC, pixel electrodes PE and relay lines (connecting lines) RL are arranged. Further, the peripheral circuits Cr1 and Cr4 are partially located in the display area DA. As illustrated, the light-shielding portion SH having light-shielding property may be arranged in the display area DA. In the example illustrated, the sealant SE, a dummy electrode DM, a light-shielding layer BM, and parts of the peripheral circuits Cr1 and Cr4 are located in the non-display area NDA. Note that of outer edge portions of the display area DA, which front the non-display area NDA, those extending along the first direction X and opposing the non-display area NDA along the second direction Y are defined as outer edge portions DAY, whereas those extending along the second direction Y and opposing the non-display area NDA along the first direction X are defined as outer edges DAX.

Next, the configuration of the display area DA will be described.

As seen in plan view, the pixel circuits PC are disposed apart from the peripheral circuits Cr1 and Cr4 (drivers DR) and are arranged in the region surrounded by the drivers DR. Further, a plurality of pixel circuits PC overlap the light-shielding portion SH, whereas some pixel circuits PC need not to overlap the light-shielding portion SH. The pixel circuits PC are electrically connected to the respective drivers DR by the respective signal lines SL and scanning lines GL illustrated in FIG. 1. As seen in plan view, some of the pixel electrodes PE overlap the respective drivers DR, and some of the pixel electrodes PE overlap the respective pixel circuits PC. Moreover, some of the pixel electrodes PE overlap the light-shielding portion SH. The relay lines RL each connect a pixel circuit PC and a respective pixel electrode PE electrically to each other one by one. The relay lines RL are each located between a pixel circuit PC and a respective pixel electrode PE and between a driver DR and a respective pixel electrode PE along the third direction Z. As seen in plan view, the light-shielding portion SH is disposed in a region surrounded by the drivers DR and is disposed apart from the relay lines RL. The light-shielding portion SH is located between the pixel circuits PC and the pixel electrode PE along the third direction Z. The light-shielding portion SH shields incident light to the pixel circuits PC from a side where an arrow of the third direction Z is located. In the example illustrated, the pixel circuits PC and the pixel electrodes PE are arranged along the first direction X and the second direction Y, respectively. Note that the arrangement is not particularly limited, but may be arranged in another direction, or in a staggered manner.

The spatial relationship and connection relationship between pixel circuits and pixel electrodes will be described in more detail by focusing on the pixel circuits PC1 to PC4, the pixel electrodes PE1 to PE4, and the relay lines RL1 to RL4 as an example.

The Pixel circuit PC1 is disposed apart from the peripheral circuit Cr1 to be adjacent thereto along the first direction X. The pixel electrode PE1 overlaps the peripheral circuit Cr1 and is disposed apart from the pixel circuit PC1 along the first direction X. The pixel electrode PE1 is located between the pixel circuit PC1 and the sealant SE along the first direction X and is located on a side closer to the outer edge DAX than the pixel circuit PC1. The relay line RL1 electrically connects the pixel circuit PC1 and the pixel electrode PE1 to each other. The relay line RL1 extends along the first direction X and overlaps those pixel electrodes PE which are located between the pixel circuit PC1 and the pixel electrode PE1 as seen in plan view.

The Pixel circuit PC2 is located alongside the pixel circuit PC1 with respect to the first direction X and is located on a side more distant from the peripheral circuit Cr1 than the pixel circuit PC1. The pixel electrode PE2 is disposed apart from the pixel circuit PC2 along the first direction X and is located alongside the pixel electrode PE1 with respect to the first direction X. The pixel electrode PE2 is located on a side more distant from the outer edge DAX than the pixel electrode PE1 and is disposed apart from the peripheral circuit Cr1. The pixel electrode PE2 is located between the pixel circuit PC2 and the pixel electrode PE1 and it overlaps the pixel circuit PC1. The relay line RL2 electrically connects the pixel circuit PC2 and the pixel electrode PE2 to each other. The relay line RL2 is placed so as not to overlap the relay lines RL1 or other relay lines RL.

The pixel circuit PC3 is located on a side more distant from the peripheral circuit Cr1 than the pixel circuit PC2 and it overlaps the light-shielding portion SH as seen in plan view. The pixel electrode PE3 overlaps the pixel circuit PC3 and in the example illustrated, it is electrically connected to the pixel circuit PC3 without a relay line. Note that the pixel electrode PE3 and the pixel circuit PC3 may be connected to each other through a relay line.

The pixel circuit PC4 is located alongside the pixel circuit PC3 with respect to the second direction Y and is located on a side closer to the peripheral circuit Cr4 than the pixel circuit PC3. The pixel circuit PC4 is disposed apart from the peripheral circuit Cr4 and adjacent thereto along the second direction Y. The pixel electrode PE4 overlaps the peripheral circuit Cr4 and it is disposed apart from the pixel circuit PC4 along the second direction Y. The pixel electrode PE4 is located between the pixel circuit PC4 and the sealant SE along the second direction Y and is located on a side closer to the outer edge DAY than the pixel circuit PC4. The relay line RL4 electrically connects the pixel circuit PC4 and the pixel electrode PE4 to each other. The relay line RL4 extends along the second direction Y and overlaps those pixel electrodes PE which are located between the pixel circuit PC4 and the pixel electrode PE4 as seen in plan view.

Next, the configuration of the non-display area NDA will be described.

The sealant SE is provided along the outer edges DAX and DAY of the display area DA with respective gaps from the outer edges DAX and DAY. In the example illustrated, the sealant SE is disposed apart from the peripheral circuits Cr1 and Cr4 as seen in plan view.

The dummy electrode DM is disposed along the outer edges DAX and DAY and is located between the outer edge DAX and the light-shielding layer BM and between the outer edge DAY and the light-shielding layer BM. In the example illustrated, the dummy electrode DM is adjacent to the outer edges DAX and DAY and partially overlaps the sealant SE as seen in plan view. Note that the dummy electrode DM may be disposed apart from the outer edges DAX and DAY or the sealant SE as seen in plan view. The dummy electrode DM is disposed on the first substrate SUB1 shown in FIG. 1 and is electrically connected to a power line of a fixed potential (not shown). The power line here is, for example, a power line of a common potential, connected to the common drive circuit. The dummy electrode DM is provided to capture ionic impurities and the like. The display device DSP needs not to comprise the dummy electrode DM.

The light-shielding layer BM is disposed on the second substrate SUB2 shown in FIG. 1. The light-shielding layer BM is adjacent to the outer edges DAX and DAY and overlaps the sealant SE and the dummy electrode DM as seen in plan view. In the example illustrated, the light-shielding layer BM does not overlap the peripheral circuits Cr1 and Cr4 entirely, but only partially overlaps the peripheral circuits Cr1 and Cr4. The light-shielding layer BM may be disposed apart from the peripheral circuits Cr1 and Cr4 as seen in plan view. But, the light-shielding layer BM does not overlap any of the pixel electrodes PE.

FIG. 3 is an enlarged plan view illustrating a region including the pixel electrodes PE1 and PE3 shown in FIG. 2. A plurality of pixel circuits PC and a plurality of pixel electrodes PE are electrically connected respectively to each other through lower connection portions CTa and upper connection portions CTb, respectively. The lower connection portions CTa are formed in through (penetrating) an insulating film 13, which will be described later, along the third direction Z. The upper connection portion CTb are formed in through an insulating film 14, which will be described later, along the third direction Z. When a pixel circuit PC and a pixel electrode PE are electrically connected to each other through a respective relay line RL, the respective lower connection portion CTa is located on one end side of the relay line RL, and the respective upper connection portion CTb is located on the other end side, which is opposite to the one end side of the relay line RL. When a pixel circuit PC and a pixel electrode PE overlap to be electrically connected to each other without via a relay line RL, the respective upper connection portion CTb at least partially overlaps the respective lower connection portion CTa as seen in plan view. In this case, the lower connection portion CTa and the upper connection portion CTb may be formed integrally as one member.

Between a pixel circuit PC1 and a pixel electrode PE1, a pixel circuit PC1 and a relay line RL1 are electrically connected to each other through a lower connection portion CTa1, and the relay line RL1 and the pixel electrode PE1 are electrically connected to each other through an upper connection portion CTb1. The upper connection portion CTb1 is disposed apart from the lower connection portion CTa1 along the first direction X as seen in plan view. Between a pixel circuit PC2 and a pixel electrode PE2, a pixel circuit PC2 and a relay line RL2 are electrically connected to each other through a lower connection portion CTa2, and the relay line RL2 and the pixel electrode PE2 are electrically connected to each other through an upper connection portion CTb2. The upper connection portion CTb2 is disposed apart from the lower connection portion CTa2 along the first direction X as well as the second direction Y as seen in plan view. Between a pixel circuit PC3 and a pixel electrode PE3, a pixel circuit PC3 and a pixel electrode PE3 are electrically connected to each other through a lower connection portion CTa3 and an upper connection portion CTb3 mutually overlapping as seen in plan view.

In the example illustrated, a plurality of lower connection portions CTa are arranged along the first direction X and the second direction Y. The lower connection portions CTa may be arranged at an equal pitch, or at different pitches from one position to another. In the example illustrated, the arrangement pitch of the lower connection portions CTa along the second direction Y is constant regardless of their positions, whereas the arrangement pitch of the lower connection portions CTa varies along the first direction X according to the distance from the peripheral circuit Cr1. The lower connection portion CTa1, closest to the peripheral circuit Cr1 among the plurality of lower connection portions CTa, is adjacent to another lower connection portion CTa at a pitch PT1 along the first direction X. The lower connection portion CTa3 disposed on a side more distant from the peripheral circuit Cr1 than the lower connection portion CTa1 is adjacent to another lower connection portion CTa at a pitch PT2 along the first direction X. The pitch PT2 is greater than the pitch PT1.

Figure 4:
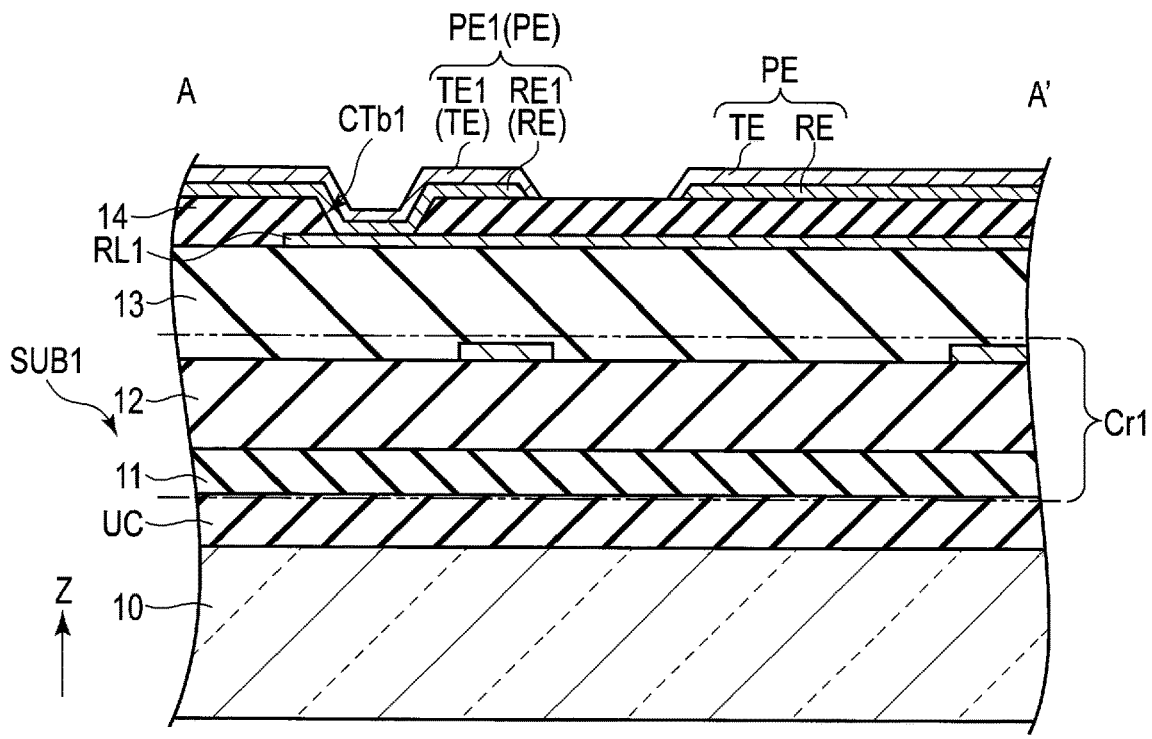
FIG. 4 is a cross section of a first substrate SUB1 taken along line A-A' in FIG. 3.
Figure 5:
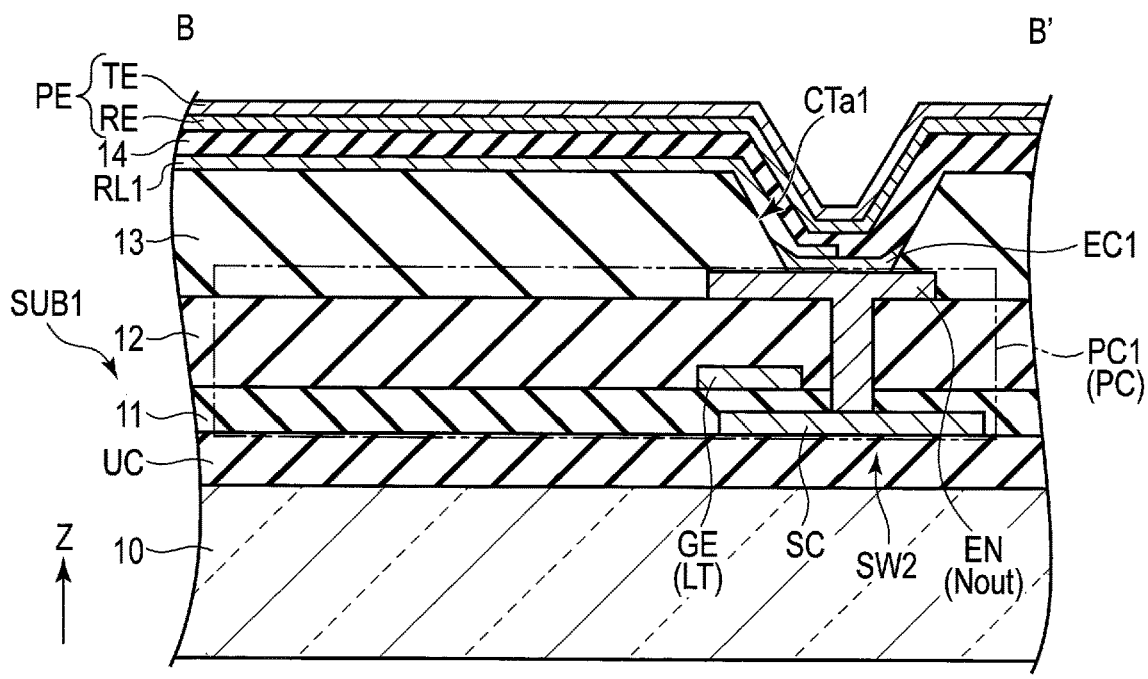
FIG. 5 is a cross section of the first substrate SUB1 taken along line B-B' in FIG. 3.

Next, the spatial relationship between the peripheral circuit Cr1, the pixel circuits PC and the pixel electrodes PE along the third directions Z will be described with reference to in FIGS. 4 to 6. Note FIGS. 4 to 6 illustrate the only structure necessary for explanation. Moreover, the side indicated by the arrow of the third direction Z is defined as up (upper side), whereas the opposite side along the third direction Z is down (lower side).

FIG. 4 is a cross section of the first substrate SUB1 taken along line A-A' in FIG. 3.

In the illustrated region, the first substrate SUB1 comprises an insulating substrate 10, an undercoat layer UC, insulating films 11, 12, 13 and 14, peripheral circuit Cr1, relay line RL1, pixel electrode PE1, etc.

The insulating substrate 10 is, for example, an insulating substrate including a pair of flat main surfaces opposing each other along the third direction Z. The undercoat layer UC is located on the insulating substrate 10. The undercoat layer UC may be of a multilayer structure including a plurality of insulating films. The undercoat layer UC may be omitted. The insulating film 11 is located above the undercoat layer UC. The insulating film 12 is located above the insulating film 11. The insulating film 13 is located above the insulating film 12. The insulating film 14 is located above the insulating film 13. The insulating films 11, 12, and 14 are each formed of, for example, an inorganic material such as silicon nitride or silicon oxide. The insulating film 13 is formed of, for example, an organic material such as resin. The materials of the insulating films 11 to 14 are not particularly limited, but, for example, the insulating film 13 may be of an inorganic material and the insulating film 14 may be of an organic material.

The peripheral circuit Cr1 is located in a region between an upper surface of the undercoat layer UC (or an upper surface of the insulating substrate 10 if the undercoat layer UC is omitted) and a lower surface of the insulating film 13. In addition, although not illustrated, the peripheral circuit Cr1 comprises various wiring lines such as scanning lines and signal lines described above, various circuit elements such as n-channel MOS transistors and p-channel MOS transistors, etc.

The relay line RL1 is located between the insulating film 13 and the insulating film 14. More specifically, the relay line RL1 is disposed apart from the peripheral circuit Cr1 by only the thickness of the insulating film 13 along the third direction Z. The relay line RL1 (RL) is formed of, for example, a metal material such as molybdenum, tungsten, aluminum or titanium or an alloy of any of these materials. But the material is not specially limited as long as it is conductive, and the line may be of, for example, a transparent conductive material such as indium tin oxide (ITO) or indium zinc oxide (IZO).

An upper connection portion CTb1 is formed on the insulating film 14. The upper connection portion CTb1 is formed in through the insulating film 14 partially so as to expose the relay line RL1 through the insulating film 14.

The pixel electrode PE1 is located on the insulating film 14. The pixel electrode PE1 is formed further in the upper connection portion CTb1 to be in contact with the relay line RL1 in the upper connection portion CTb1. A pixel electrode PE adjacent to the pixel electrode PE1 with a gap therebetween opposes the relay line RL1 along the third direction Z through the insulating film 14. The pixel electrode PE is disposed apart from the peripheral circuit Cr1 along the third direction Z. In the example illustrated, the pixel electrode PE comprises a reflecting electrode RE and a transparent electrode TE. The reflecting electrode RE is located lower in the respective pixel electrode PE and the transparent electrode TE covers the reflecting electrode RE. The reflecting electrode RE is formed of a metal material having light reflectivity such as aluminum or silver. The transparent electrode TE is formed of a transparent conductive material having light transmissivity such as ITO or IZO, which can suppress the corrosion of the reflecting electrodes RE.

FIG. 5 is a cross section of the first substrate SUB1 taken along line B-B' in FIG. 3.

In addition to the structure described with reference to FIG. 4, the first substrate SUB1 comprises a switch portion SW2, a node electrode EN, a contact electrode EC1 and the like in the illustrated region. Moreover, in place of the pixel electrodes PE1 and PE2, it comprises a pixel electrode PE.

The switch portion SW2 comprises a semiconductor layer SC, a gate electrode GE and a node electrode EN equivalent to source/drain. The semiconductor layer SC is located above the insulating substrate 10 and is covered by the insulating film 11. The gate electrode GE is located on the insulating film 11 and is covered by the insulating film 12. The gate electrode GE is electrically connected to a latch portion LT, which will be described later with reference to FIG. 8, in a region which is not illustrated. In the example illustrated, the switch portion SW2 is of a top-gated type in which the gate electrode GE is located above the semiconductor layer SC, but may be a bottom-gate type in which the gate electrode GE is located below the semiconductor layer SC. Moreover, the switch portion SW2 illustrated is of a single-gate structure in which one gate electrode GE opposes the semiconductor layer SC, but may be of a double-gate structure in which two gate electrodes GE oppose the semiconductor layer SC.

The node electrode EN is located on the insulating film 12 to be in contact with the semiconductor layer SC and is covered by the third insulating film 13. The node electrode EN is equivalent to the output node Nout, which will be described later with reference to FIG. 8 and is electrically connected to the semiconductor layer of a switch portion SW3, which will be also described later with reference to FIG. 8, in a region not illustrated.

The pixel circuit PC1 is located in a region between the upper surface of the undercoat layer UC (or the upper surface of the insulating substrate 10 if the undercoat layer UC is omitted) and the lower surface of the insulating film 13. That is, the pixel circuit PC1 is located in the same layer as that of the peripheral circuit Cr1. Similarly, the other pixel circuits PC are located respectively in the same layers as those of the peripheral circuits Cr1 to Cr4. The pixel circuits PC each include the switch portion SW2.

The lower connection portion CTa1 is formed in the insulating film 13. The lower connection portion CTa1 is formed in through the insulating film 13 partially so as to expose the node electrode EN through the insulating film 13.

The contact electrode EC1 is formed inside the lower connection portion CTa1 so as to cover the node electrode EN in the lower connection portion CTa1.

The relay line RL1 is provided also inside the lower connection portion CTa1 so as to be in contact at least partially with the contact electrode EC1. That is, the relay line RL1 is electrically connected to the pixel circuit PC1 (node electrode EN) through the contact electrode EC1.

As seen in the figure, the pixel electrode PE opposes the contact electrode EC1 and the relay line RL1 via the insulating film 14 and is electrically disconnected from the pixel circuit PC1.

FIG. 6 is a cross section of the first substrate SUB1 taken along line C-C' in FIG. 3.

The cross section of the illustrated region is different from that of FIG. 5 in that the light-shielding portion SH is present, the relay line RL is not provided, and the upper connection portion CTb3 is located inside the lower connection portion CTa1.

In the cross section of the illustrated region, the first substrate SUB1 comprises the pixel circuit PC3, the contact electrode EC3, the light-shielding portion SH, the pixel electrode PE3 and the like.

The contact electrode EC3 is disposed inside the lower connection portion CTa3 so as to cover the node electrode EN in the lower connection portion CTa3. The light-shielding portion SH is located between the insulating film 13 and the insulating film 14, and is located on the same layer (insulating film 13) as that of the relay line RL. The light-shielding portion SH should desirably be formed of, for example, a metal material having light-shielding property such as the material for the relay line RL. In this case, the relay line RL and the light-shielding portion SH can be formed at the same time in the same process. The light-shielding portion SH opposes the pixel electrode PE3 via the insulating film 14. Further, the light-shielding portion SH is provided also in the gap between each adjacent pair of pixel electrodes PE. With this configuration, the light-shielding portion SH shields the light from the upper portion of the first substrate SUB1 through the gap between each adjacent pair of pixel electrodes PE from entering the pixel circuit PC.

The insulating film 14 is located on the insulating film 13, the contact electrode EC3 and the light-shielding portion SH. The upper connection portion CTb3 is formed in through the region located in the lower connection portion CTa3 of the insulating film 13 so as to exposing the contact electrode EC3 through the insulating film 13.

The pixel electrode PE3 is located also inside the upper connection portion CTb3 to be in contact at least partially with the contact electrode EC3. That is, the pixel electrode PE3 is electrically connected to pixel circuit PC3 (node electrode EN) through the contact electrode EC3.

Figure 7A:
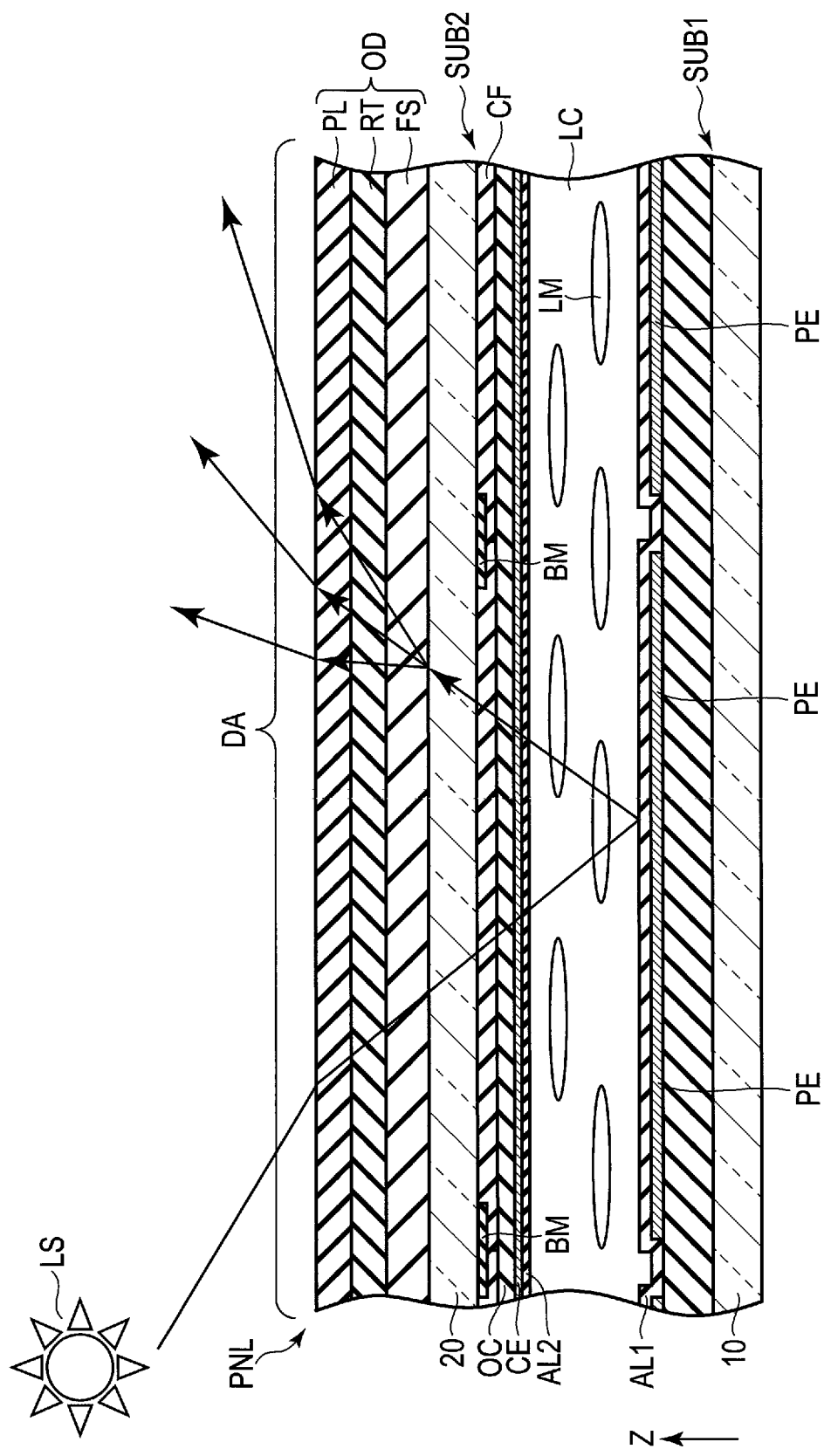
FIG. 7A is a diagram showing a cross section of the display panel PNL.

FIG. 7A is a cross section of the display panel PNL.

This figure illustrates the only structure necessary for explanation in the section of the display panel PNL in the display area DA. The display panel PNL comprises the first substrate SUB1, the second substrate SUB2, the liquid crystal layer LC and an optical device OD.

The first substrate SUB1 comprises an alignment film AL1 in addition to the structure described with reference to FIG. 4 or 6. The alignment film AL1 covers the pixel electrodes PE.

The second substrate SUB2 comprises an insulating substrate 20, a light-shielding layer BM, a color filter layer CF, an overcoat layer OC, a common electrode CE, an alignment film AL2 and the like. The light-shielding layer BM is located on a side of the insulating substrate 20, which opposes the first substrate SUB1. In the display area DA illustrated here, the light-shielding layer BM opposes the gap between the pixel electrodes PE adjacent to each other. Further, as shown in FIG. 2, the light-shielding layer BM is located also in the non-display area NDA. The color filter layer CF is located on a side of the insulating substrate 20, which opposes the first substrate SUB1, and those members partially overlap the light-shielding layer BM. The color filter layer CF opposes the pixel electrodes PE1 to PE4 illustrated in FIG. 2, and in this configuration example, it opposes all of the pixel electrodes PE. The color filter layer CF includes a red filter, a green filter, a blue filter, etc. The red filter is placed to oppose the pixel electrode of a sub-pixel (red pixel) which displays red. The green filter is placed to oppose the pixel electrode of a sub-pixel (green pixel) which displays green. The blue filter is placed to oppose the pixel electrode of a sub-pixel (blue pixel) which displays blue. When the color filter layer CF is formed to include a red filter, a green filter and a blue filter, the main pixel is constituted to include at least one of each of the red pixel, green pixel and blue pixel. Note that the color filter layer CF may further include other color filters, and for example, it may further include a white filter placed at a sub-pixel which displays white, or a transparent layer. The overcoat layer OC covers the color filter layer CF. The common electrode CE is located on a side of the overcoat layer OC, which opposes the first substrate SUB1. The common electrode CE opposes a plurality of pixel electrode PE. The common electrode CE is formed of a transparent conductive material such as ITO or IZO. The alignment film AL2 covers the common electrode CE.

Note that in the second substrate SUB2, a plurality of filters of different colors are stacked on a boundary between sub-pixels displaying different colors, and therefore the transmissivity can be reduced, in which case, the light-shielding layer BM may be omitted. In a display panel PNL of the monochrome type, the color filter layer CF is omitted.

The liquid crystal layer LC is held between the first substrate SUB1 and the second substrate SUB2 and contains liquid crystal molecules LM between the alignment film AL1 and the alignment film AL2.

The optical device OD is located on a side of the second substrate SUB2, which is opposite to the surface thereof in contact with the liquid crystal layer LC. The optical device OD comprises, for example, a scattering layer FS, a retardation film RT, a polarizer PL and the like. In the example illustrated, the scattering layer FS is adhered onto the insulating substrate 20, the retardation film RT is stacked on the scattering layer FS and the polarizer PL is stacked on the retardation film RT. Note that the configuration of the optical device OD is not limited to the example illustrated.

As long as it can scatter the incidence light on the pixel electrode PE or the reflection light reflected by the pixel electrode PE, the configuration of the scattering layer FS is not particularly limited. Moreover, in the example illustrated, the scattering layer FS is provided in the optical device OD and disposed in the second substrate SUB2. However, the location of the scattering layer FS is not particularly limited as long as it is placed on an opposite side to the side of the pixel electrode PE, which opposes the relay line RL, so as to oppose the pixel electrode PE. The scattering layer FS can suppress non-uniformity in display caused by the unevenness of the pixel electrodes PE and also can expand the viewing angle by diffusing the reflection light on the pixel electrodes PE. In the example illustrated, the scattering layer FS is an anisotropic scattering layer which scatters light entering from a specific direction. The scattering layer FS, which is an anisotropic scattering layer, has the function of transmitting light entering from the light source LS side in the figure without substantially scattering it, but scattering light from a specific direction, that is, the reflection light from the pixel electrodes PE. Note that the scattering layer FS, which is an anisotropic scattering layer, should be of a multilayered structure for the purpose of expanding the range of diffusion, preventing rainbow hues and the like.

The retardation film RT has a function as a quarter waveplate. For example, the retardation film RT is a layered member in which a quarter waveplate and a half waveplate are stacked, formed to reduce the wavelength dependency and to obtain a desired phase difference in the wavelength range used for color display. The polarizer PL, which includes a transmission axis, transmits polarized components parallel to the transmission axis and absorbs or reflects polarized components perpendicularly crossing the transmission axis.

In such a display panel PNL, the side closer to the light source LS is equivalent to the display surface side. In the example illustrated, the surface of the optical device OD is equivalent to the display surface. However, if a cover member is disposed on the surface of the optical device OD, the surface of the cover member is equivalent to the display surface. The light entering the display panel PNL from the light source LS is linearly polarized when transmitting the polarizer PL. The linearly polarized light passes through the liquid crystal layer LC of the display panel PNL before and after reflected by the pixel electrodes PE.

FIG. 7B is a cross section of the scattering layer FS shown in FIG. 7A.

In the example illustrated, the scattering layer FS comprises the anisotropic scattering layers AS1 and AS2 stacked on one another. The anisotropic scattering layer AS1 includes an upper surface AS1$a$ on a side closer to the light source LS and a lower surface AS1$b$ on an opposite side to the upper surface AS1$a$. The anisotropic scattering layer AS2 includes an upper surface AS2$a$ on a side closer to the light source LS and a lower surface AS2$b$ on an opposite side to the upper surface AS2$a$. The anisotropic scattering layer AS2 is located on a side of the anisotropic scattering layer AS1, which opposes the pixel electrode PE. The anisotropic scattering layers AS1 and AS2 adhered to each other, for example.

The anisotropic scattering layer AS1 comprises a plurality of transparent members TP1 and transparent members TP2. The refractive index of the transparent members TP1 differs from that of the transparent members TP2. The transparent members TP1 and TP2 are arranged from the upper surface AS1$a$ over to the lower surface AS1$b$ and are each inclined along the same direction with respect to the third direction Z. The transparent members TP1 and TP2 are arranged alternately in a direction parallel to the upper surface AS1$a$ (the lower surface AS1$b$). Note that the anisotropic scattering layer AS2 as well comprises transparent members TP1 and TP2 and has a configuration similar to that of the anisotropic scattering layer AS1. In the example illustrated, the transparent members TP2 of the anisotropic scattering layer AS1 in the lower surface AS1$b$ are arranged to be shifted respectively from the transparent members TP2 of the anisotropic scattering layer AS2 in the upper surface AS2$a$.

FIG. 7C is a plan view of the anisotropic scattering layer AS1 shown in FIG. 7B.

The transparent members TP1 and TP2 extend, for example, in stripes along in the second direction Y and arranged alternately with respect to the first direction X. The widths of the transparent members TP1 and TP2 along the first direction X are not particularly limited. For example, the width of transparent members TP1 along the first direction X may be greater than that of the transparent members TP2.

FIG. 7C shows an example in which the transparent members TP1 and TP2 extend in the second direction Y, but the arrangement is not limited to this. The transparent members TP1 and TP2 may extend along the first direction X. Moreover, FIGS. 7B and 7C show a louvor-like configuration in which a plurality of tabular transparent members TP2 are arranged at predetermined intervals in the transparent members TP1, but the arrangement is not limited to this.

For example, the anisotropic scattering layer AS1 may be of a pillar structure (cylindrical structure) as shown in FIG. 7D. In the pillar structure, the transparent members TP2 are formed to be cylindrical and arranged in the transparent members TP1. The transparent members TP2 are aligned along the same direction, and are irregularly arranged as seen in plan view.

FIG. 7E is a cross section of the display panel PNL, which illustrates an example of the optical path of incidence light when scattering in the scattering layer FS is isotropic.

In the example illustrated, the scattering layer FS is an isotropic scattering layer which can scatter incident light from any direction. The scattering layer FS has a function of scattering the incidence light on the pixel electrodes PE from the light source LS side in the figure, and scattering the reflection light by the pixel electrodes PE. The scattering layer FS is, for example, an adhesive having light scattering property.

Figure 7F:
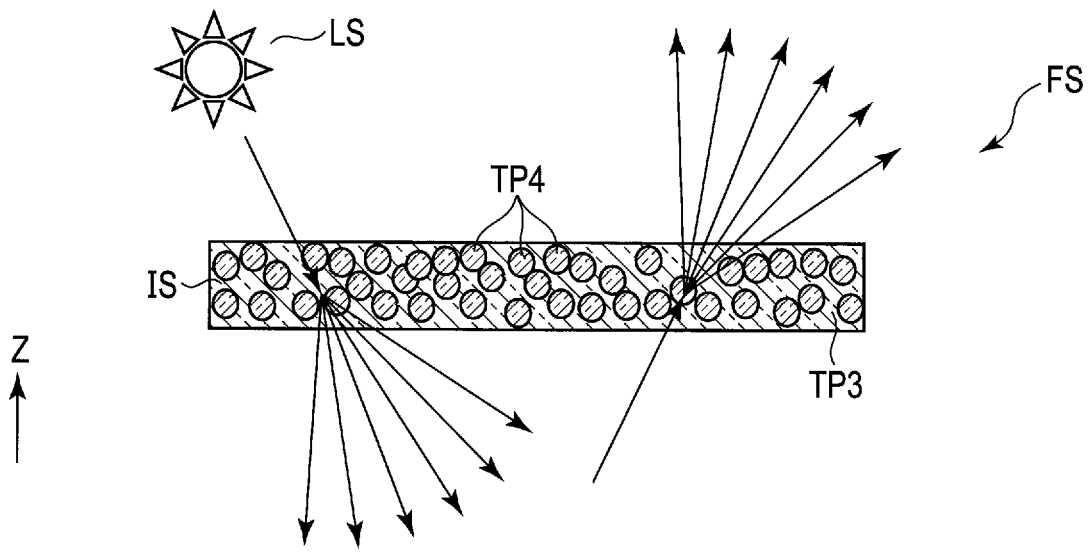
FIG. 7F is a cross section of the scattering layer FS shown in FIG. 7E.

FIG. 7F is a cross section of the scattering layer FS shown in FIG. 7E.

The scattering layer FS comprises an isotropic scattering layer IS. The isotropic scattering layer IS comprises a transparent member TP3 and a plurality of transparent members TP4. The refractive index of the transparent members TP4 differs from that of the transparent member TP3. The transparent members TP4 are formed to be, for example, spherical. The shape is not particularly limited, but it may be, for example, pillar-like or discoidal. The transparent members TP4 are dispersed in the transparent member TP3.

Figure 7G:
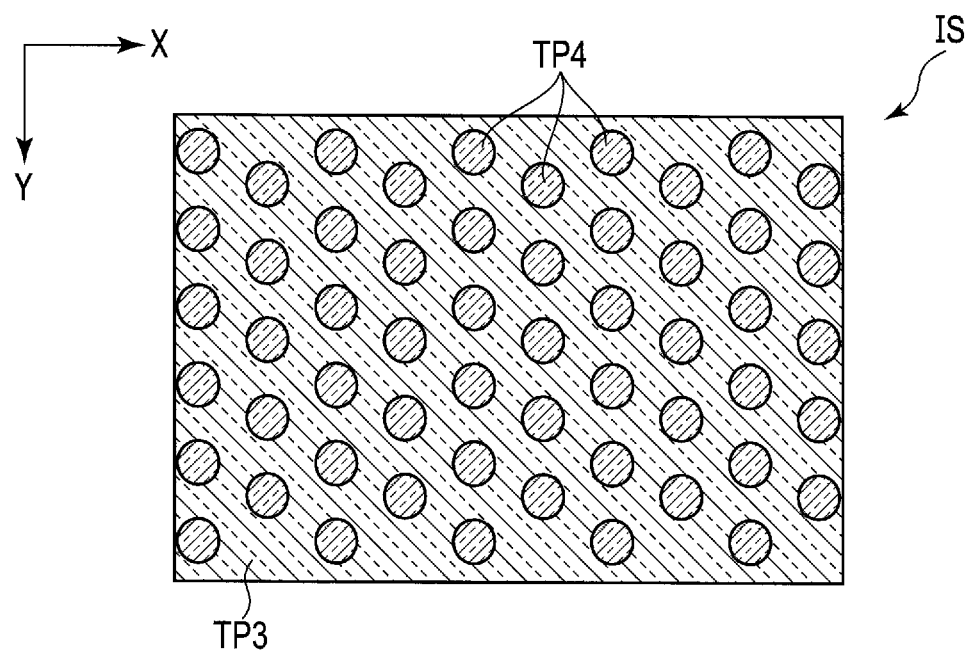
FIG. 7G is a plan view of an isotropic scattering layer IS shown in FIG. 7F.

FIG. 7G is a plan view of the isotropic scattering layer IS shown in FIG. 7F.

As illustrated in FIG. 7F and FIG. 7G, a plurality of transparent members TP4 are dispersed in the transparent member TP3. In the example illustrated, the density of the transparent members TP4 in the transparent member TP3 is substantially uniform along the first direction X and the second direction Y.

In the configuration example, the display device DSP comprises, as seen in plan view, the pixel circuit PC1 disposed apart from the peripheral circuit Cr1, the pixel electrode PE1 overlapping the peripheral circuit Cr1 and the relay line RL1 electrically connecting the pixel circuit PC1 and the pixel electrode PE1 to each other. With this configuration, even a region overlapping the peripheral circuit Cr1 can contribute to display. Further, even those pixel electrodes PE overlapping the peripheral circuit Cr1 are connected respectively to the individual pixel circuits PC one by one, and therefore the pixel electrodes PE in the region overlapping the peripheral circuit Cr1 can be controlled in a manner equivalent to that of the pixel electrodes PE in a region disposed apart from the peripheral circuit Cr1. Furthermore, in the case where the pixel electrodes PE each comprise the reflecting electrode RE and the pixel electrodes PE overlapping the driver DR oppose the color filter layers CF, the display device DSP can exhibit a display performance to be obtained in the region located on an inner side with respect to the peripheral circuit Cr1, equivalently also in the region which overlaps the peripheral circuit Cr1. In this manner, the display area DA can be expanded even in the regions close to the outer edges DAX and DAY while maintaining the display performance substantially equivalent to that achieved near the central portion of the display area DA.

Moreover, for example, the insulating films 13 and 14 are located between the pixel circuit PC and the pixel electrodes PE and the relay line RL is located between the insulating film 13 and the insulating film 14. In this case, the relay line RL is in contact with the pixel circuits PC and the pixel electrodes PE only in the positions of the lower connection portion CTa and the upper connection portion CTb. With this configuration, the relay line RL can be disposed to overlap the driver DR, the pixel circuit PC and the pixel electrodes PE, as seen in plan view. In other words, the relay line RL does not need to detour the pixel circuit PC and the pixel electrodes PE as seen in plan view, but it can be wired regardless of the locations of the pixel circuits PC and the pixel electrodes PE. For example, the pixel electrode PE2 is disposed apart from the pixel circuit PC2 in the first direction X and the lower connection portion CTa2 is disposed apart from the upper connection portion CTb2 along the first direction X and the second direction Y. The relay line RL2 extends along the first direction X and the second direction Y so as not to be brought into contact with other relay lines RL, but to overlap a plurality of pixel electrodes PE. More specifically, the relay lines RL may extend not only along a direction in which the pixel circuits PC and pixel electrodes PE are respectively disposed apart from each other, but also along a direction crossing the direction in which the pixel circuits PC and the pixel electrodes PE separate from each other. Therefore, the relay lines RL can connect those pixel circuits PC and pixel electrodes PE, which are located to be disposed apart from each other, respectively to each other.

When the lower connection portions CTa1 and CTa2 are arranged along the first direction X, the number of bents of the relay lines RL1 and RL2 can be reduced. Thus, the relay lines RL can be arranged densely, thereby making it possible to increase the number of pixel electrodes PE which can be arranged in the positions which overlap the peripheral circuits Cr1 to Cr4.

Moreover, when the pitch PT1 is less than the pitch PT2, it becomes possible to increase the number of pixel circuits PC which can be disposed in the regions located on an inner side with respect to the peripheral circuits Cr1 to Cr4, and therefore the number of pixel electrodes PE which can be disposed in the positions which overlap the peripheral circuits Cr1 to Cr4 can be increased.

The display device DSP may comprise, as seen in plan view, a pixel circuit PC4 disposed apart from the peripheral circuit Cr4, a pixel electrode PE4 overlapping the peripheral circuit Cr4 and a relay line RL4 electrically connecting the pixel circuit PC4 and the pixel electrode PE4 to each other. In this case, even the region which overlaps the peripheral circuit Cr4 can contribute to display. That is, the display area DA can be expanded not only along the first direction X but also along the second direction Y.

In addition, the display device DSP comprises a light-shielding portion SH located between the insulating film 13 and the insulating film 14 as in the case of the relay lines RL. The light-shielding portion SH can shield external light which enter the transistors of the pixel circuits PC to cause malfunction, and thus it is possible to improve the display quality of the display device DSP.

As described above, according to this embodiment, it is possible to provide a display device DSP whose frame can be narrowed.

Next, a configuration example of a segment SG which constitutes a pixel will be described. Here, the segment SG is equivalent to the minimum unit to be driven independently to display images and in this embodiment, there are the same number of segments SG formed as that of the pixel electrodes PE. For example, as will be described in Embodiment 2, when the main pixel PX comprises a plurality of sub-pixels P and each sub-pixel P comprises a plurality of pixel electrodes PE, each sub-pixel P is constituted by a plurality of segments SG.

Figure 8:
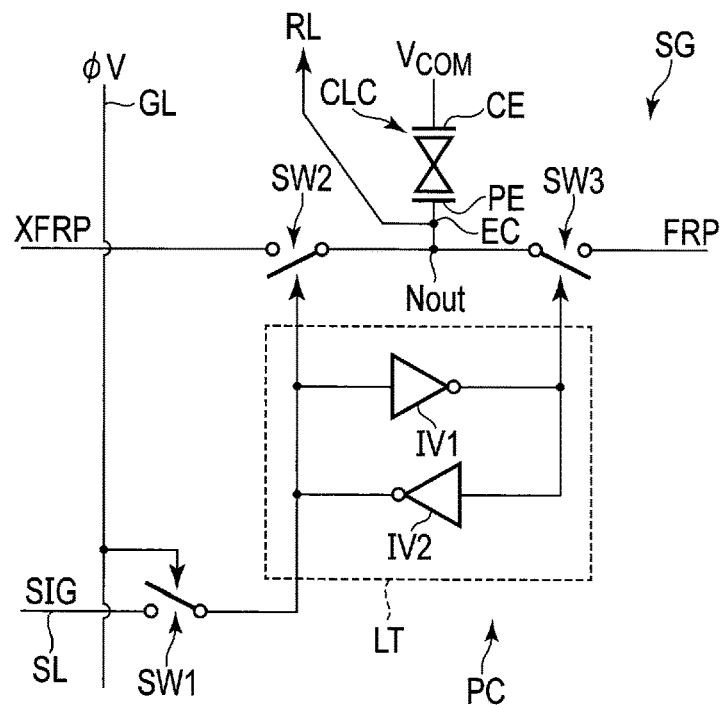
FIG. 8 is a diagram showing a configuration example of a segment SG.

FIG. 8 is a diagram showing a configuration example of the segment SG.

The segment SG comprises a liquid crystal capacitance CLC and a pixel circuit PC. The liquid crystal capacitance CLC means the capacitive component of a liquid crystal layer LC, generated between a pixel electrode PE and a common electrode CE. The pixel electrode PE is electrically connected to the pixel circuit PC. The common electrode CE opposes the pixel electrode PE and is electrically connected to a common drive circuit (not shown), to which a common potential Vcom is applied.

The pixel circuit PC comprises three switch portions SW1 to SW3 and a latch portion LT. The switch portion SW1 is formed from, for example, a single n-channel MOS transistor. The switch portion SW1 includes one end electrically connected to a signal line SL and another end electrically connected to the latch portion LT. The ON/OFF operation of the switch portion SW1 is controlled by a scanning signal supplied from a scanning line GL. That is, the switch portion SW1 is placed in an ON (closed) state by applying a scanning signal φV via the scanning line GL from the scanning-line driving circuit included in the peripheral circuit Cr2 or Cr4 shown in FIG. 1, thus capturing the data (the signal potential corresponding to gradation) SIG supplied via the signal line SL from the signal line driving circuit included in the peripheral circuit Cr1 or Cr3 shown in FIG. 1.

The latch portion LT comprises inverters IV1 and IV2 connected in parallel but to be inverted with respect to each other. Each of the inverters IV1 and IV2 is, for example, a CMOS inverter. The latch portion LT holds (latches) the potential according to the data SIG captured by the switch portion SW1. In other words, the latch portion LT functions as a memory which can hold data.

The switch portions SW2 and SW3 are each formed from, for example, a transfer switch constituted by an n-channel MOS transistor and a p-channel MOS transistor connected in parallel, but they may be formed using transistors of some other configuration. To one end of the switch portion SW2, a potential XFRP of a phase opposite to that of the common potential Vcom is applied. To one end of the switch portion SW3, a potential FRP in phase with the common potential Vcom is applied. The other ends of the switch portions SW2 and SW3 are connected to each other and further electrically connected to the pixel electrode PE so as to serve as an output node Nout of the pixel circuit PC. According to the polarity of the holding potential of the latch portion LT, the respective one of the switch portions SW2 and SW3 is placed in the ON state. Thus, in the liquid crystal capacitance CLC in which the common potential Vcom is applied to the common electrode CE, the in-phase potential FRP or the antiphase potential XFRP is applied to the pixel electrode PE.

Figure 9:
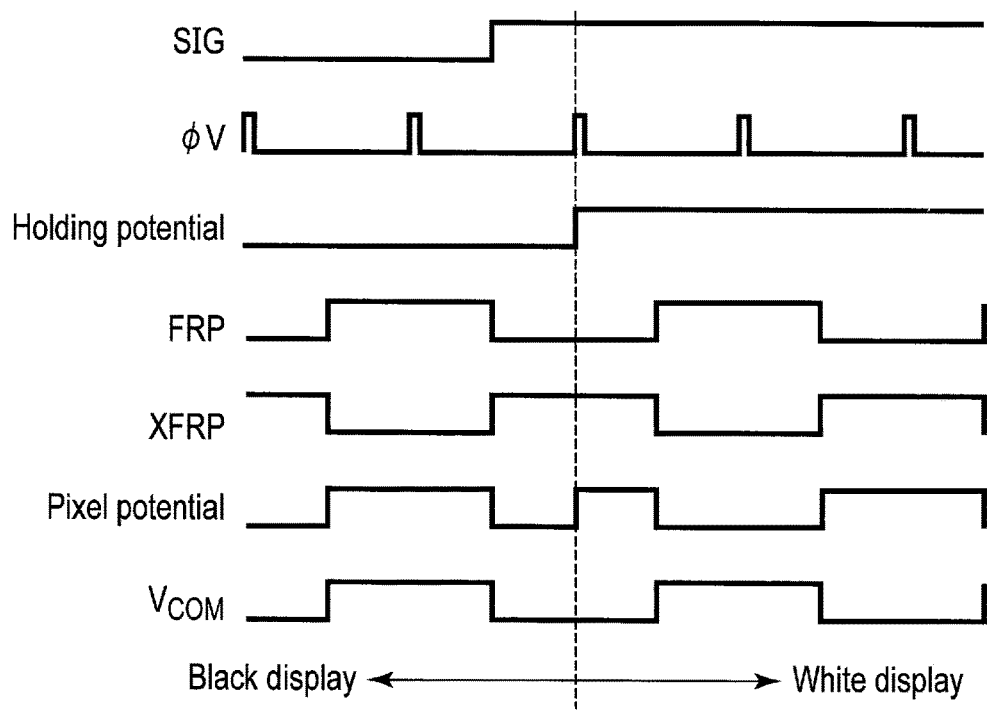
FIG. 9 is a timing chart illustrating operation of the segment SG shown in FIG. 8.

FIG. 9 is a timing chart for illustrating the operation of the segment SG shown in FIG. 8.

Here, the following descriptions will be made in connection with an example in which the normally black mode is applied, which displays black while voltage is not applied to the liquid crystal layer LC.

In the pixel circuit PC, the data SIG supplied to the signal line SL is captured at the timing at which the scanning signal φV is given to the switch portion SW1 and the potential according to the captured data SIG is held in the latch portion LT. When the pixel circuit PC captures data SIG equivalent to logical "0", the polarity of the holding potential of the latch portion LT is negative. In this case, the switch portion SW2 is placed in an OFF (open) state and the switch portion SW3 is in the ON (closed) state, and thus the potential FRP in phase with the common potential Vcom is applied to the pixel electrode PE. Therefore, the pixel potential of the pixel electrode PE becomes equivalent to the common potential Vcom of the common electrode CE. As a result, voltage is not applied to the liquid crystal layer LC, and the segment SG displays black.

On the other hand, when the pixel circuit PC captures data SIG equivalent to logical "1", the polarity of the holding potential of the latch portion LT is positive. In this case, the switch portion SW3 is placed in the OFF (open) state, and the switch portion SW2 is in the ON (closed) state, and thus the potential XFRP of a phase opposite to that of the common potential Vcom is applied to the pixel electrode PE. Therefore, a potential difference is created between the pixel potential of the pixel electrode PE and the common potential Vcom of the common electrode CE, thereby applying voltage to the liquid crystal layer LC. As a result, the light transmitting the liquid crystal layer LC is modulated, and part of the modulated light contributes to display. Therefore, the segment SG displays white.

As described above, in this embodiment, the memory portion in the pixel circuit PC can store binary data (logical "1"/logical "0") and based on the digital binary data, gradation can be expressed. In order for a display device of the MIP system using such binary data to express gradation, for example, the area gradation system can be adopted, in which each sub-pixel is constituted by a plurality of segments SG and gradation is expressed by the combination of areas of a plurality of segments SG. Here, the area gradation system is a gradation expressing system which expresses, for example, $2^n$ gradation scales by N segments SG whose areas ratios are weighed as $2^0, 2^1, 2^2, \ldots,$ and $2^{n-1}$.

Such an MIP system can express the gradation of a sub-pixel using the data held in the memory portion, and therefore it is not necessary to perform a write, which is to write a signal potential reflecting a gradation for each pixel, by a frame period. Thus, it is possible to reduce the power consumption of the display device DSP.

In the meantime, there are needs to rewrite only some pixels in a display image displayed on the display area DA. In this case, it suffices if the signal potentials of the segments SG are partially rewritten. More specifically, data is transmitted only to the pixel circuits PC of those segments SG which need to be rewritten, and it is no longer necessary to transmit data to the pixel circuits PC of those segments SG which need not be rewritten. Thus, the amount of data transfer can be reduced, and therefore it is possible to achieve further power-saving of the display device DSP.

Moreover, in a structure to which the MIP system is applied, either one of the switch portions SW2 and SW3 is placed in the ON state according to the polarity of the holding potential of the latch portion LT, and accordingly the potential FRP in phase or the potential XFRP of antiphase is applied to the pixel electrode PE. Thus, a constant voltage is always applied to the segments SG, and therefore shading can be suppressed.

Next, a configuration example of the display device DSP in the case where the area gradation system is applied to this embodiment will be described. In the following descriptions, the explanation of the structures already discussed in Embodiment 1 will be omitted. Further, according to Embodiment 2 and its modified example, an advantageous effect similar to that described in Embodiment 1 can be obtained.

Embodiment 2

Figure 10:
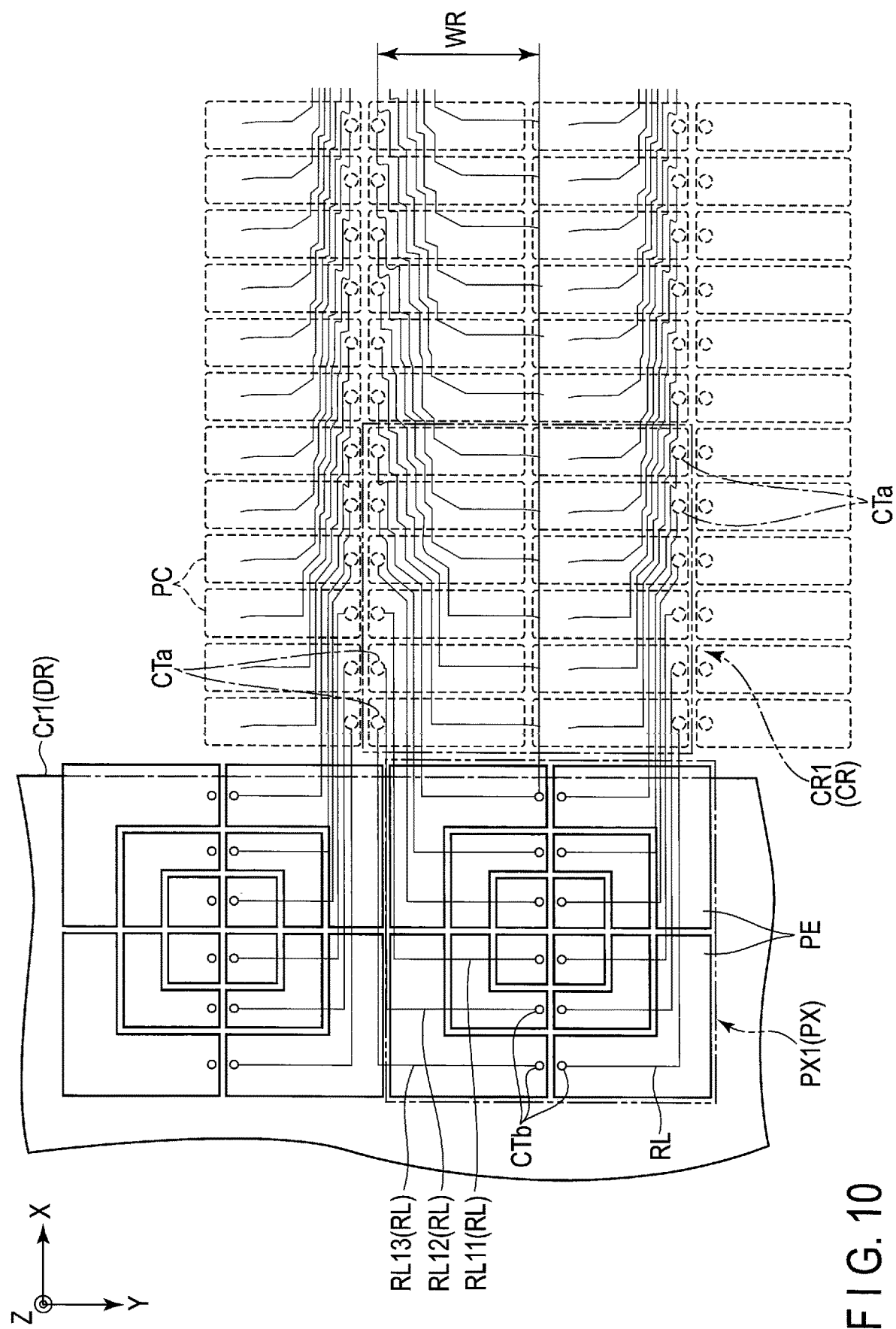
FIG. 10 is a plan view showing a configuration example of a main pixel PX and a main pixel circuit CR.

FIG. 10 is a plan view showing a configuration example of a main pixel PX and a main pixel circuit CR. This diagram shows an enlarged illustration of a region near an outer edge of the display area DA.

The display device DSP comprises a plurality of main pixels PX and a plurality of main pixel circuits CR which drive the main pixels PX, respectively. Each main pixel PX is equivalent to a region which constitutes the minimum unit of display. In the example illustrated, each main pixel PX has substantially a square shape with sides along the first direction X and the second direction Y being substantially equal to each other. Note that the shape is not particularly limited, but may be, for example, polygonal, circular or the like.

Each main pixel PX comprises a plurality of pixel electrodes PE, and each main pixel circuit CR comprises a plurality of pixel circuits PC. The pixel electrodes PE of the main pixel PX and the pixel circuits PC of the main pixel circuit CR corresponding to the main pixel PX are electrically connected respectively to each other one by one through relay lines RL, respectively. In the example illustrated, the lower connection portions CTa are arranged along the first direction X and the upper connection portions CTb are arranged also along the first direction X. The lower connection portions CTa and the upper connection portions CTb are respectively disposed apart from each other along the second direction Y. The relay lines RL are provided in a wiring region WR defined a plurality of lower connection portions CTa and a plurality of upper connection portions CTb. The wiring region WR extends along the first direction X.

A main pixel PX1 overlaps the peripheral circuit Cr1 as seen in plan view. A main pixel circuit CR1 which drives the main pixel PX1 is disposed apart from the peripheral circuit Cr1 (driver DR) as seen in plan view. The peripheral circuit CR1 is disposed apart from the main pixels PX along the first direction X and shifted with respect to the main pixels PX along the second direction Y.

Figure 11:
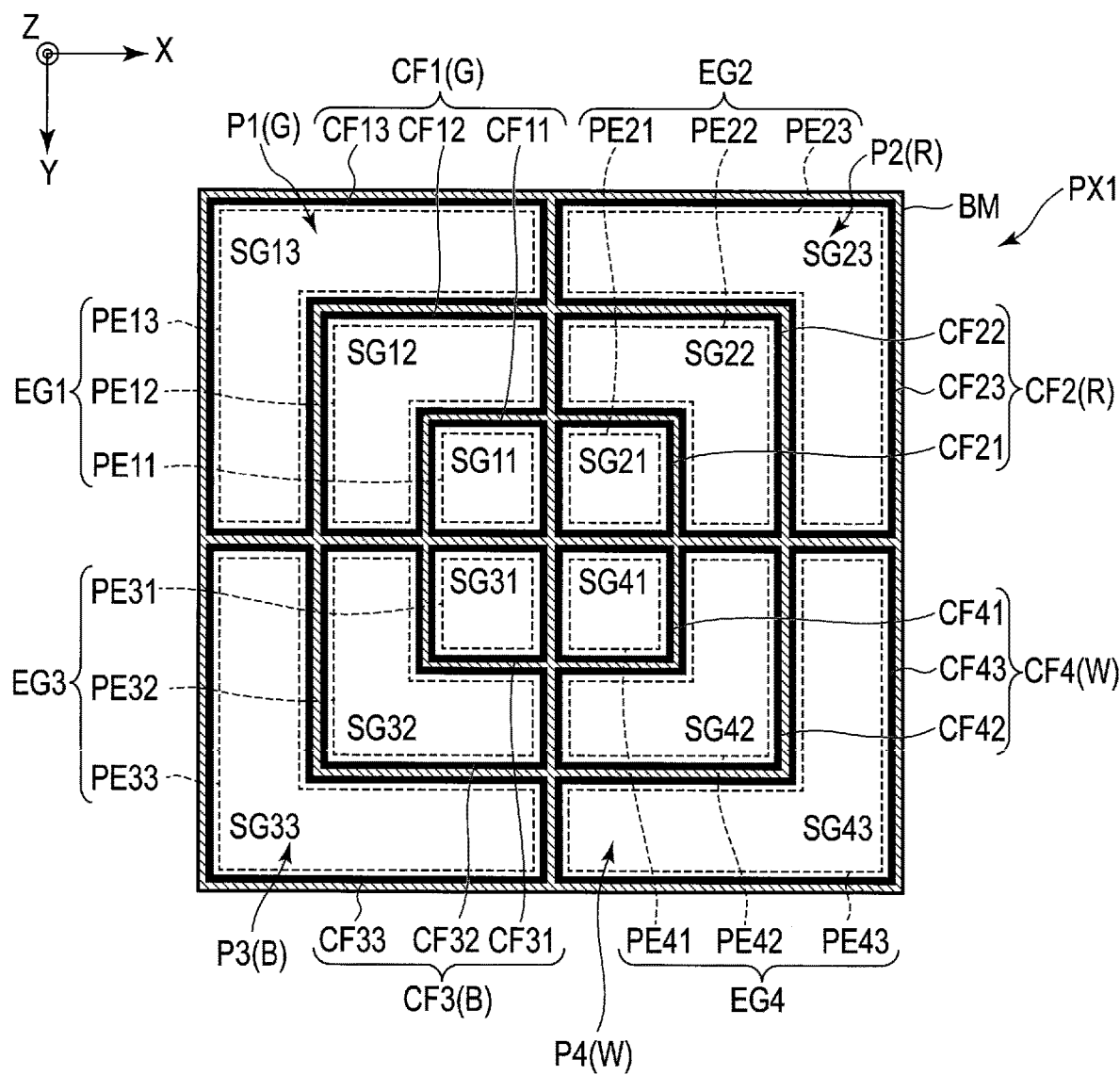
FIG. 11 is a plan view illustrating the spatial relationship between a pixel electrode and a color filter in the main pixel PX1 shown in FIG. 10.

FIG. 11 is a plan view illustrating the spatial relationship between a pixel electrode and a color filter in the main pixel PX1 shown in FIG. 10.

The main pixel PX1 comprises sub-pixels P1, P2, P3, and P4, the brightness of which is controlled by area gradation. Each of the sub-pixels P1 to P4 is equivalent to a region which displays a color in the main pixel PX1 and they display different colors, respectively. The main pixel PX1 is partitioned by the light-shielding layer BM. The sub-pixels P1 to P4 are each further partitioned by the light-shielding layer BM. The sub-pixels P1 to P4 are rectangular (or square) and their areas of the sub-pixels P1 to P4 are substantially equal to each other. In the example illustrated, the sub-pixels P1 to P4 are squares with sides along the first direction X and the second direction Y which are substantially equal to each other.

The sub-pixel P1 and the sub-pixel P2 are arranged along the first direction X. The sub-pixel P3 and the sub-pixel P4 are arranged along in the first direction X. On the other hand, the sub-pixel P1 and the sub-pixel P3 are arranged along the second direction Y. The sub-pixel P2 and the sub-pixel P4 are arranged along the second direction Y. In the example illustrated, the sub-pixel P1 is a G pixel which displays green (G), the sub-pixel P2 is an R pixel which displays red (R), the sub-pixel P3 is a B pixel which displays blue (B) and the sub-pixel P4 is a W pixel which displays white (W).

The sub-pixel P1 is adjacent to the sub-pixel P2 along the first direction X and adjacent to the sub-pixel P3 along the second direction Y. The sub-pixel P4 is located diagonally with respect to the sub-pixel P1, adjacent to the sub-pixel P3 along the first direction X and adjacent to the sub-pixel P2 along the second direction Y. Note that the colors corresponding to the sub-pixels P1 to P4 shown in FIG. 11 are merely an example and the sub-pixels may correspond to any different colors, respectively. However, it is desirable that the B pixel and W pixel be adjacent to each other. Further, the R pixel and G pixel should desirably be adjacent to each other.

The sub-pixels P1 to P4 each comprise three segments SG for expressing 3-bit gradation. In this configuration example, the display region of each segment SG is defined to be equivalent to a region where the pixel electrodes PE corresponding to the respective segment SG are disposed, and which is partitioned by the light-shielding layer BM. The area of a segment SG is defined as the area of the display region of the segment SG.

In the main pixel PX1, the sub-pixels P1 to P4 have a similar configuration. The configuration of the sub-pixels will be described in detail. Note that the sub-pixel P1 will be discussed as a typical example, and the explanations of the other sub-pixels P2 to P4 will be omitted.

The sub-pixel P1 comprises three segments SG11 to SG13 for displaying 3-bit gradation. The sub-pixel P1 comprises an electrode group EG1 including the three pixel electrodes PE11 to PE13. The pixel electrode PE11 is disposed in the display region of the segment SG11, the pixel electrode PE12 is in that of the segment SG12, and the pixel electrode PE13 is in that of the segment SG13. As seen in plan view, the pixel electrodes PE11 to PE13 oppose each other via the light-shielding layer BM.

The area of the segment SG11 is a display region equivalent to the least significant bit (for example, $2^0$) in the 3-bit area gradation. The area of the segment SG13 is a display region equivalent to the most significant bit (for example, $2^2$) in the 3-bit area gradation. The area of segment SG12 is a display region equivalent to the middle bit (for example, $2^1$) in the 3-bit area gradation. With the combinations of the segments SG11 to SG13, it is possible to display 3-bit area gradation.

The area of the segment SG12 is greater than that of the segment SG11 and the area of segment SG13 is greater than that of the segment SG12. Similarly, the area of the pixel electrode PE12 is greater than that of the pixel electrode PE11 and the area of the pixel electrode PE13 is greater than that of the pixel electrode PE12. The ratio in area of the segment SG11, segment SG12 and segment SG13 is, for example, 1:2:4 ($=2^0:2^1:2^2$). Or the ratio in area of the pixel electrode PE11, pixel electrode PE12 and pixel electrode PE13 is 1:2:4 ($=2^0:2^1:2^2$). Note that the combinations of the area ratios of the pixel electrodes PE11 to PE13 and the segments SG11 to SG13 are not limited to those of the example described above.

The sub-pixel P1 comprises a color filter CF1 including color filters CF11 to CF13. The color filter CF1 is, for example, a green filter. Along the third direction Z, the color filter CF1 opposes the electrode group EG1, and the color filters CF11 to CF13 oppose the pixel electrodes PE11 to PE13, respectively. As seen in plan view, the light-shielding layer BM is provided in each interval among the color filters CF11 to CF13. The color filters CF11 to CF13 may be disposed apart from each other or may be formed as one member. The electrode group EG1 and the color filter CF1 overlap the peripheral circuit Cr1 illustrated in FIG. 10 as seen in plan view.

The sub-pixel P2 is constituted by segments SG21 to 23, and comprises an electrode group EG2 including pixel electrodes PE21 to PE23. The sub-pixel P2 comprises a red filter CF2 including color filters CF21 to CF23 and overlapping the electrode group EG2. The sub-pixel P3 is constituted by segments SG31 to 33, and comprises an electrode group EG3 including pixel electrodes PE31 to PE33. The sub-pixel P3 comprises a blue filter CF3 including color filters CF31 to CF33 and overlapping the electrode group EG3. The sub-pixel P4 is constituted by segment SG41 to 43 and comprises an electrode group EG4 which including pixel electrodes PE41 to PE43. The sub-pixel P4 comprises a white filter CF4 including color filters CF41 to CF43 and overlapping the electrode group EG4.

When the colors of the sub-pixels P1 to P4 differ from RGBW, it suffices if the colors of the color filters CF1 to CF4 are changed accordingly.

FIG. 12 is a plan view showing a configuration example of the electrode groups EG1 to EG4 in the main pixel PX1 shown in FIG. 10.

The main pixel PX1 extends along the first direction X and includes a boundary line B1 located between the sub-pixels P1 and P3 and also between the sub-pixels P2 and P4. The main pixel PX1 also extends along the second direction Y and includes a boundary line B2 located between the sub-pixels P1 and P2 and the sub-pixels P3 and P4. The layout of the electrode groups EG1 to EG4 is not particularly limited, but in the example illustrated, the electrode groups EG3 and EG4 are laid out to be symmetrical with the electrode groups EG1 and EG2 respectively with respect to the boundary line B1 as a line of the axis of symmetry. Similarly, the electrode groups EG2 and EG4 are laid out to be symmetrical with the electrode groups EG1 and EG3, respectively with respect to the boundary line B2 as a line the axis of symmetry. Moreover, the electrode groups EG1 to EG4 are laid out to be symmetrical respectively to each other about an intersection XP between the boundary line B1 and the boundary line B2 as the point of symmetry.

Next, the configuration of the electrode group EG1 will be described by focusing on the sub-pixel P1 as a typical example. The explanations of the configurations of the other electrode groups EG2 to EG4 will be omitted.

The pixel electrode PE11 has a quadrangular shape with two intersecting sides SD1 and SD2 of the pixel electrode PE11 located close to the boundary lines B1 and B2, respectively. The pixel electrode PE12 has an L shape arranged along two intersecting sides SD3 and SD4 of the four sides of the pixel electrode PE11, which are located on a side disposed apart from the boundary lines B1 and B2. The pixel electrode PE13 has an L type arranged along the other two sides SD7 and SD8, oppose two sides SD5 and SD6 adjacent to the pixel electrode PE11 of the pixel electrode PE12. The pixel electrode PE11 is located on a side close to the intersection XP of the pixel electrode PE12, and the pixel electrode PE13 is located on a side disposed apart from the intersection XP of the pixel electrode PE12.

The figure (rectangle) formed by the pixel electrodes PE11 and PE12 is similar to that of the pixel electrode PE11. The figure (rectangle) formed by the pixel electrodes PE11 to PE13 is similar to the figure (rectangle) formed by the pixel electrodes PE11 and PE12. With this configuration, it is possible to suppress the change in shape of the light-emitting region of the sub-pixel P1 in a middle gradation.

An upper connection portion CTb11 electrically connects the pixel electrode PE11 to the relay line RL11 shown in FIG. 10. An upper connection portion CTb12 electrically connects the pixel electrode PE12 to the relay line RL12 shown in FIG. 10. An upper connection portion CTb13 electrically connects the pixel electrode PE13 to the relay line RL13 shown in FIG. 10. The upper connection portions CTb11 to CTb13 are located in end portions of the pixel electrodes PE11 to PE13, respectively, on a side adjacent to the electrode group EG3 and are arranged along the first direction X by the boundary line B1. In other words, the upper connection portions CTb11 to CTb13 are located in an end portion EEG1 of the electrode group EG1 along the second direction Y. In this embodiment, the end portion EEG1 is equivalent to the region enclosed by a dashed line in the figure.

The upper connection portions CTb21 to CTb23 disposed in the electrode group EG2 are located in an end portion of the electrode group EG2, which is on a side adjacent to the electrode group EG4 and are arranged along the first direction X by the boundary line B1. The upper connection portions CTb11 to CTb13 and the upper connection portions CTb21 to CTb23 are located on the same straight line. Since the configuration of the electrode groups EG1 and EG3 is symmetrical with respect to the boundary line B1 as the line of symmetry, the upper connection portions CTb31 to CTb33 disposed on pixel electrode EG3 are located in an end portion of the electrode group EG3, which is on a side adjacent to the electrode group EG1, and are arranged along the first direction X by the boundary line B1. The upper connection portions CTb41 to CTb43 disposed on the pixel electrode EG4 have configurations similar to those of the upper connection portions CTb31 to CTb33. The upper connection portions CTb31 to CTb3, and CTb41 to CTb43 are located on the same straight line.

As described above, in the example illustrated, the upper connection portions CTb are located in the end portions of the sub-pixels P1 to P4 along the second direction Y, in the central portion of the main pixel PX1 along the second direction Y, and also arranged along the first direction X.

FIG. 13 is a schematic diagram showing a configuration example of circuit groups CG1 to CG4 in the main pixel circuit CR1 shown in FIG. 10.

It is assumed here that the pixel circuits PC are formed in regions defined by alternate long and short dash lines in the figure. The detailed configuration thereof is not illustrated, but they may be of any configuration as long as the equivalent circuit shown in FIG. 8 is realizable. In the example illustrated, the pixel circuits PC arranged along the first direction X have the same configuration in layout. Moreover, each pair of pixel circuits PC adjacent to each other along the second direction Y have the same configuration in the layout symmetrical with respect to a straight line extending along the first direction X as an axis of symmetry. In the example illustrated, the signal lines SL1 to SL3 are each equivalent to an axis of symmetry. In this example, one pixel circuit PC is formed in a region partitioned by two adjacent signal lines SL and two adjacent scanning lines GL, but the embodiment is not limited to this. For example, it may be partitioned by other wiring lines such as lines for supplying the potential FRP or potential XFRP.

The pixel circuits PC11 to PC13 and the pixel circuits PC21 to PC23 are formed in regions respectively, whose sides along the first direction X are respectively less than those along the second direction Y and are arranged along the first direction X. The pixel circuits PC31 to PC33 and the pixel circuits PC41 to PC43 are formed in regions respectively, whose sides along the first direction X are less than those along the second direction Y, and are arranged along the first direction X.

The pixel circuits PC11 to PC13 constitute the circuit group CG1 which drives the electrode group EG1 of the sub-pixel P1. The pixel circuits PC21 to PC23 constitute the circuit group CG2 which drives the electrode group EG2 of the sub-pixel P2. The pixel circuits PC31 to PC33 constitute the circuit group CG3 which drives the electrode group EG3 of the sub-pixel P3. The pixel circuits PC41 to PC43 constitute the circuit group CG4 which drives the electrode group EG4 of the sub-pixel P4. The circuit group CG2 is adjacent to the circuit group CG1 along the first direction X, and the circuit group CG4 is adjacent to the circuit group CG3 along the first direction X. The circuit group CG3 is adjacent to the circuit group CG1 along the second direction Y, and the circuit group CG4 is adjacent to the circuit group CG2 along the second direction Y.

In the region corresponding to a pixel circuit PC, the latch portion LT illustrated in FIG. 8 and the lower connection portion CTa in FIG. 10 are disposed as seen in plan view. The latch portion LT and the lower connection portion CTa are located to be adjacent to each other along the second direction Y, for example. Next, the configuration of a pixel circuit PC will be described while focusing on the circuit group CG1 as a typical example.

The pixel circuits PC11 to PC13 respectively comprise latch portions LT11 to LT13 and lower connection portions CTa11 to CTa13. The latch portions LT11 to LT13 are respectively disposed in the central portions of the pixel circuits PC11 to PC13 as seen in plan view. The lower connection portion CTa11 electrically connects the pixel circuit PC11 to the relay line RL11 shown in FIG. 10. The lower connection portion CTa12 electrically connects the pixel circuit PC12 to the relay line RL12 shown in FIG. 10. The lower connection portion CTa13 electrically connects the pixel circuit PC13 to the relay line RL13 shown in FIG. 10. The lower connection portions CTa11 to CTa13 are aligned respectively with the latch portions LT11 to LT13 along the second direction Y, and arranged at positions closer to the signal line SL1 than the latch portions LT11 to LT13 as seen in plan view. More specifically, the lower connection portions CTa11 to CTa13 are respectively disposed in end portions EPC11 to EPC13 of those of the pixel circuits PC11 to PC13 along the second direction Y, which are located on an opposite side to the side adjacent to the circuit group CG3, and are arranged along the first direction X.

The circuit group CG2 has the same configuration in layout as that of the circuit group CG1, and the circuit groups CG3 and CG4 have the configuration in layout symmetrical to the circuit groups CG1 and CG2 with respect to the signal line SL2 as the axis of symmetry. That is, the lower connection portions CTa21 to CTa23 disposed in the circuit group CG2 are located in positions closer to the signal line SL1 than the latch portions LT21 to LT23 and are arranged along the first direction X. The lower connection portions CTa11 to CTa13 and CTa21 to CTa23 are located on the same straight line. The lower connection portions CTa31 to CTa33 disposed in the circuit group CG3 are located in positions closer to the signal line SL3 than the latch portions LT31 to LT33. The circuit group CG4 is similar to that of the circuit group CG3. The lower connection portions CTa31 to CTa33 and CTa41 to CTa43 are arranged along the first direction X on the same straight line.

As described above, in the example illustrated, the lower connection portions CTa disposed on the main pixel circuit CR1 are located in the respective end portions of the circuit groups CG1 to CG4 along the second direction Y and in the both end portions of the main pixel circuit CR1 along the second direction Y and they are arranged along the first direction X.

In this configuration example, the upper connection portions CTb and the lower connection portions CTa are arranged along the first direction X. The lower connection portions CTa and the upper connection portions CTb are respectively disposed on the same respective straight lines and are separated respectively from each other along the second direction Y. Thus it is possible to secure the wiring region WR extending along the first direction X. In this manner, as compared to the case where the wiring region WR is dispersed, longer relay lines RL can be employed to be able to place the electrode group EG1 in a position more distant from the circuit group CG1. That is, the region which overlaps the driver DR as seen in plan view of the display area DA can be expanded.

For example, the upper connection portions CTb disposed on the main pixel PX1 are located along the first direction X in the respective end portions of the electrode groups EG1 to EG4 along the second direction Y, and arranged near the boundary line B1 equivalent to the central portion of the main pixel PX1 along the second direction Y by the boundary line B1. Further, the lower connection portions CTa disposed in the main pixel circuit CR1 are arranged in the respective end portions of the circuit groups CG1 to CG4 along the second direction Y, and arranged in the both end portions of the main pixel circuit CR1 along the second direction Y. In this manner, the width of the wiring region WR along the second direction Y can be increased. Note that in the example shown in FIG. 10, the main pixel PX1 is shifted in the second direction Y from the main pixel circuit CR1, and therefore the electrode group EG1 is shifted in the second direction Y from the circuit group CG1. As a result, the wiring region WR where the relay lines RL11 to RL13 which connect the electrode group EG1 and circuit group CG1 to each other are disposed can be expanded further.

Figure 14:
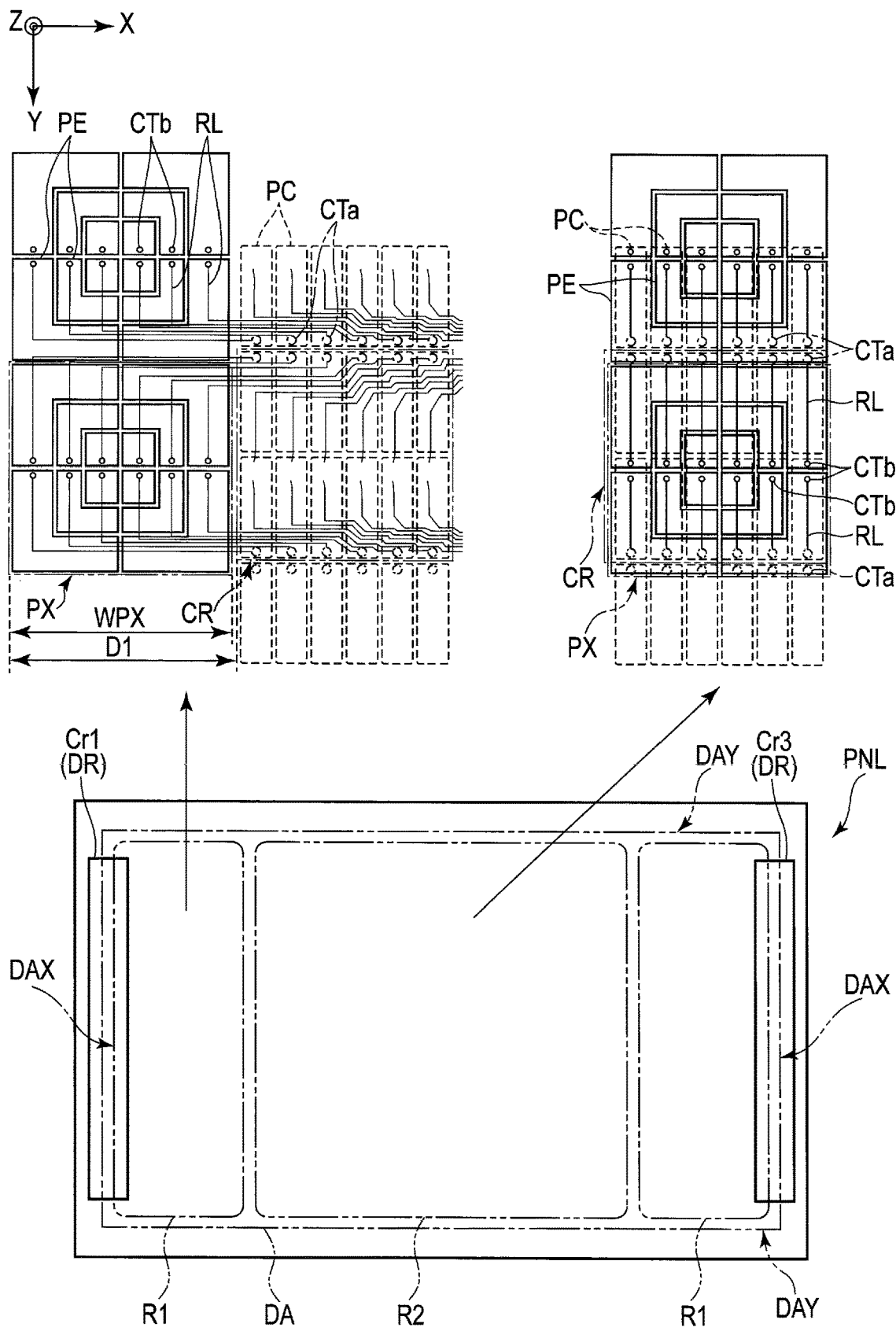
FIG. 14 is a diagram showing an arrangement example of a main pixel PX and a main pixel circuit CR in the display panel PNL.

FIG. 14 is a diagram showing an example of arrangement of the main pixels PX and the main pixel circuits CR in the display panel PNL.

In order to narrow the frame area along the first direction X in the vicinities of the outer edges DAX, it is desirable for the display area DA to include regions R1 and R2 such as shown. The two regions R1 are disposed along the outer edges DAX, respectively. The region R2 is located in the central portion of the display area DA and between the regions R1 along the first direction X.

In the display panel PNL, a plurality of main pixels PX are arranged along the first direction X and the second direction Y and also a plurality of main pixel circuits CR are arranged along the first direction X and the second direction Y. In the region R1, the main pixels PX are shifted respectively in the first direction X from the corresponding main pixel circuits CR as seen in plan view. A displacement D1 of the main pixels PX from the main pixel circuit CR in the first direction X is small in locations near the region R2 and large in locations near the outer edges DAX. In the regions overlapping the peripheral circuits Cr1 and Cr3, the displacement D1 of the main pixels PX from the main pixel circuits CR along the first direction X is greater than the width WPX of the main pixels PX along the first direction X, and as discussed above, the main pixels PX are separated respectively from the main pixel circuits CR as seen in plan view. On the other hand, in the region R2, the main pixels PX are not shifted from the corresponding main pixel circuit CR in the first direction X as seen in plan view.

In the example illustrated, the configuration in layout of the pixel electrodes PE disposed in the main pixels PX of the regions R1 is similar to that of the main pixels PX in the region R2. The configuration in layout of the main pixel circuits CR in the regions R1 is similar to that of the region R2, and the configurations in layout of the pixel circuits PC located along the first direction X are similar to each other regardless of the regions R1 and region R2. The lower connection portions CTa are arranged along the first direction X all over the regions R1 and R2. The upper connection portions CTb are arranged along the first direction X all over the regions R1 and R2 as well, but respectively disposed apart from the lower connection portions CTa along the second direction Y. The configurations in layout of the relay lines RL are different between the regions R1 and the region R2. More specifically, the relay lines RL of the regions R1 are arranged in an L shape extending along the first direction X and also the second direction Y, whereas the relay lines RL of the region R2 are arranged in a straight line extending along the second direction Y.

In the regions R1, the regions where the density of relay lines RL is high, and those where the density is low are located alternately along the second direction Y. In the regions close to the lower connection portions CTa, the density of the relay lines RL extending along the first direction X is high, whereas in the regions disposed apart from the lower connection portions CTa, the density of the relay lines RL extending along the first direction X is low. In the regions where the density of the relay lines RL is high, the surfaces of the pixel electrodes PE on an opposite side to a side opposing the relay lines RL protrude in some cases, as compared to the region where the density of the relay lines RL is low. More specifically, in some cases, protrusions and recesses are formed periodically along the second direction Y in the surfaces of a plurality of pixel electrodes PE. In this case, non-uniformity in reflection is caused by the unevenness of the surfaces of the pixel electrodes PE, thereby creating stripe-like non-uniformity in display in the regions R1. However, the display device DSP comprises the scattering layer FS shown in FIGS. 7A to 7G, which can scatter the reflection light from the pixel electrodes PE. Therefore, even with the configuration example shown in FIG. 14, it is possible to suppress the generation of the non-uniformity in display in the regions R1.

MODIFIED EXAMPLES

Next, modified examples of the configuration discussed in Embodiment 2 will be described. In the following modified examples, the configuration will be described focusing on the sub-pixel P1 as a typical example and the detailed explanations of the sub-pixels P2 to P4 will be omitted. Note that advantageous effects similar to those of Embodiment 2 can be obtained in the modified examples as well.

First Modified Example

Figure 15:
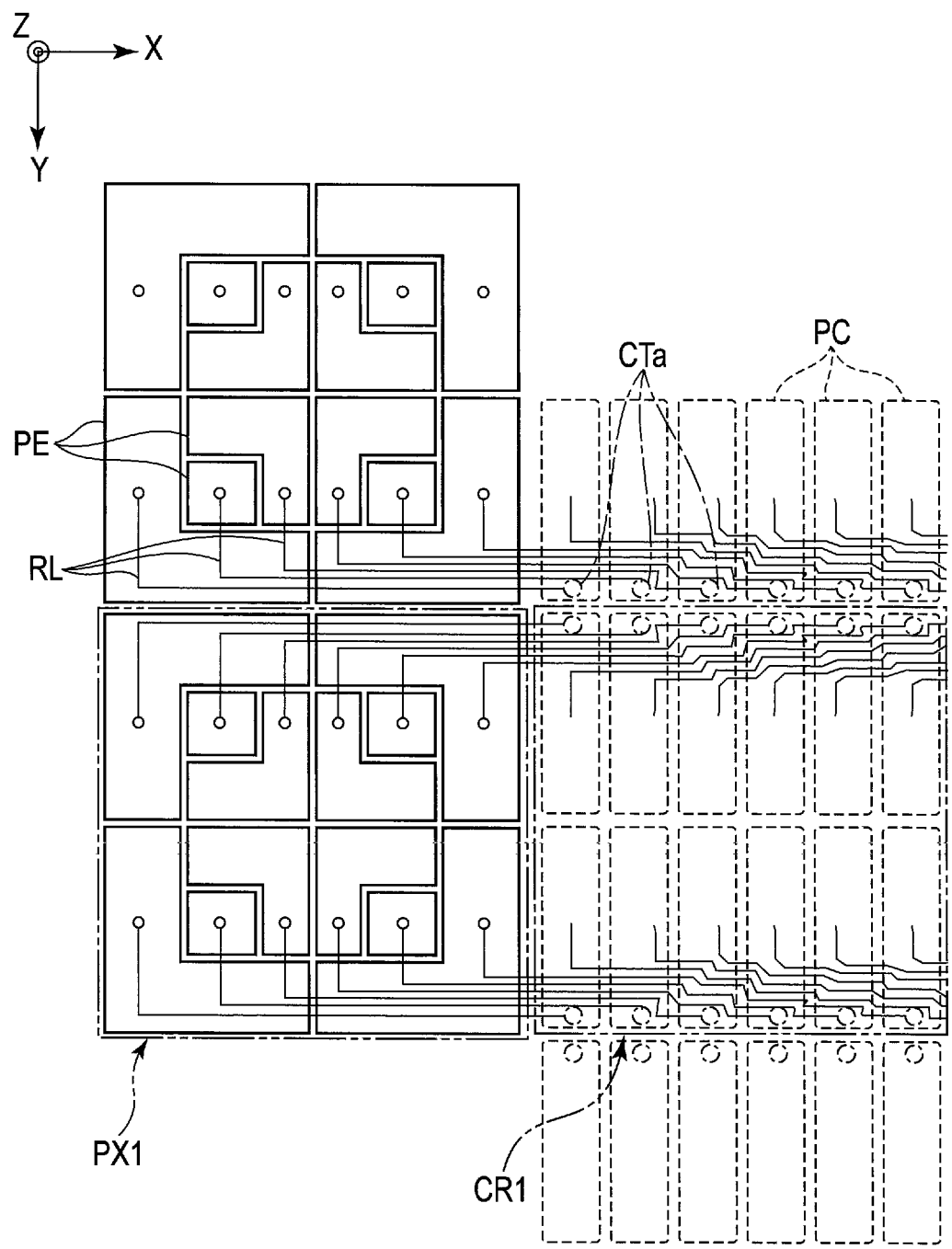
FIG. 15 is a diagram showing the first modified example of the structure of the main pixel PX and the main pixel circuit CR shown in FIG. 10.

FIG. 15 is a diagram showing the first modified example of the configuration of the main pixel PX and the main pixel circuit CR shown in FIG. 10.

This modified example is different from the configuration example shown in FIG. 10 in that the main pixel PX1 and the main pixel circuit CR1 are not shifted in the second direction Y. In this modified example, the lower connection portions CTa disposed in the main pixel circuit CR1 respectively oppose the pixel electrodes PE of the main pixel PX1 along the first direction X.

Figure 16:
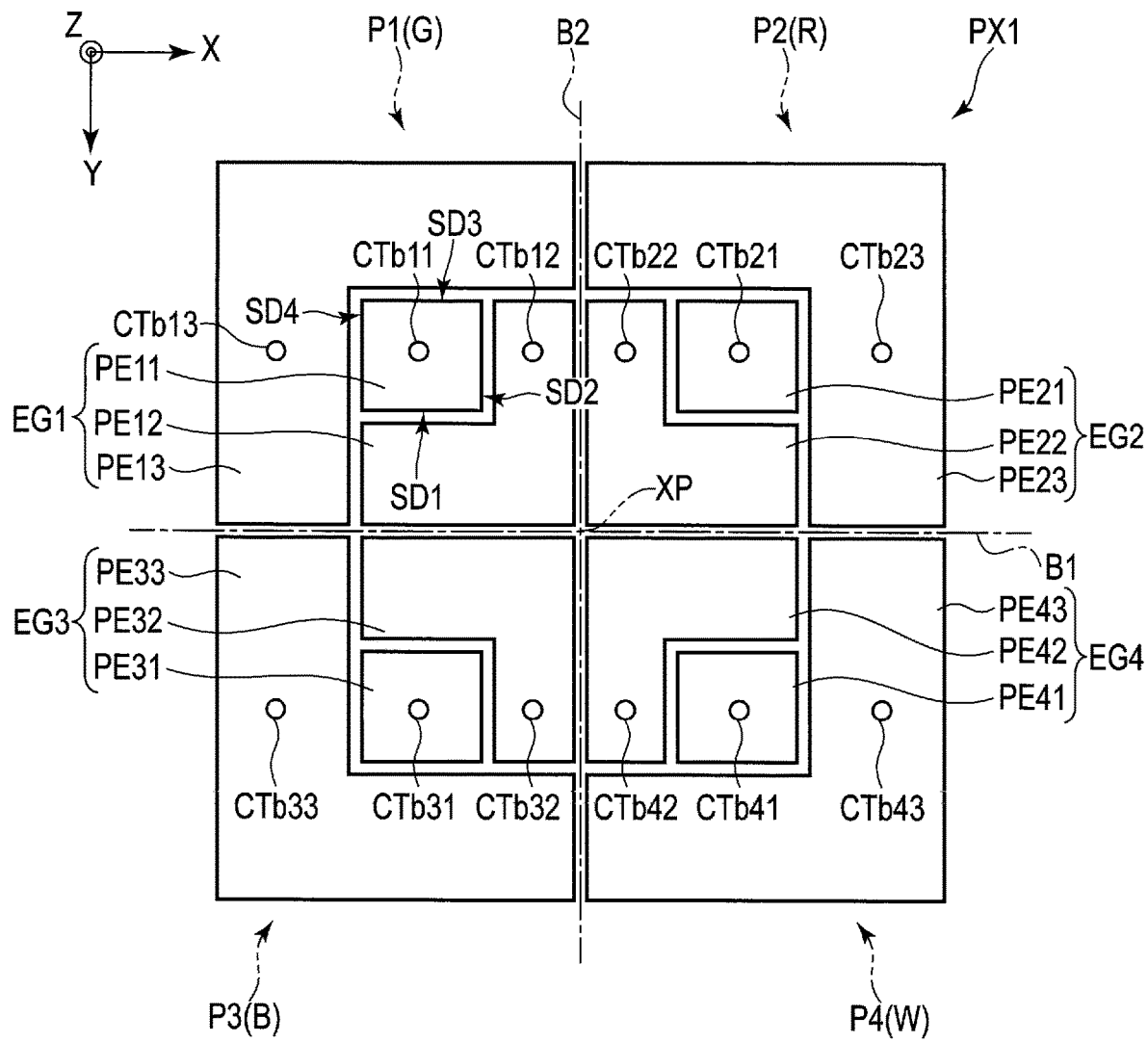
FIG. 16 is a diagram showing the first modified example of the structure of the electrode groups EG1 to EG4 shown in FIG. 12.

FIG. 16 is a diagram showing the first modified example of the configuration of the electrode groups EG1 to EG4 shown in FIG. 12.

The electrode groups EG1 to EG4 shown in FIG. 16 are electrode groups of the main pixel PX1 illustrated in FIG. 15. This modified example is different from the configuration example shown in FIG. 12 in the positions of the pixel electrode PE11, PE21, PE31 and PE41.

Of the three pixel electrodes PE11 to PE13, the smallest pixel electrode PE11 is disposed at the center of the sub-pixel P1. The middle-sized pixel electrode PE12 is disposed along two crossing sides SD1 and SD2 of the pixel electrode PE11. The largest pixel electrode PE13 is disposed along the other two crossing side SD3 and SD4 of the pixel electrode PE11. The pixel electrode PE12 is disposed on a side close to the intersection XP of the pixel electrode PE11, and the pixel electrode PE13 is disposed on a side disposed apart from the intersection XP of the pixel electrode PE11.

The upper connection portion CTb11 is disposed in the central portion of the pixel electrode PE11. The upper connection portions CTb11 to CTb13 are located along the first direction X in the central portion of the electrode group EG1 with respect to the second direction Y, and are arranged on the same straight line.

Second Modified Example

FIG. 17 is a diagram showing the second modified example of the configuration of the electrode groups EG1 to EG4 shown in FIG. 12.

This modified example is different from the configuration example shown in FIG. 12 in that the pixel electrodes PE11, PE21, PE31 and PE41 are each located on a side opposite to the side close to the boundary line B1 of the sub-pixels P1 to P4.

The pixel electrode PE11 is adjacent to the boundary line B2 and is disposed apart from the boundary line B1. The pixel electrode PE12 has an L type arranged along two crossing sides of the pixel electrode PE11. Two sides of the pixel electrode PE11, which are adjacent to the pixel electrode PE12 are one opposing the boundary line B1 and the other on an side opposite to that adjacent to the boundary line B2. The pixel electrode PE13 has an L type arranged along the other two sides opposing the two sides of the pixel electrode PE12, which are adjacent to the pixel electrode PE11. The pixel electrode PE13 is adjacent to the boundary lines B1 and B2.

The upper connection portions CTb11 to CTb13 are respectively disposed in end portions of the pixel electrodes PE11 to PE13, located on a side opposite to the side adjacent to the electrode group EG3. The upper connection portions CTb of the main pixel PX1 are disposed in the both end portions of the main pixel PX1 along the second direction Y, and are arranged along the first direction X.

Third Modified Example

FIG. 18 is a diagram showing the third modified example of the configuration the electrode groups EG1 to EG4 shown in FIG. 12.

This modified example is different from the configuration example shown in FIG. 12 in that the pixel electrodes PE are each formed into stripes.

The pixel electrodes PE11 to PE13 are arranged along the first direction X, and extend along the second direction Y to be each adjacent to the boundary line B1. The pixel electrode PE13 is disposed apart from the boundary line B2. The pixel electrode PE11 is located between the pixel electrode PE13 and the boundary line B2. The pixel electrode PE12 is located between the pixel electrode PE11 and the boundary line B2.

As in the modified example illustrated in FIG. 17, the upper connection portions CTb11 to CTb13 are respectively disposed in an end portion of the electrode group CG1, on a side opposite to the side adjacent to the electrode group CG3, and are arranged along the first direction X.

Next, another modified example will be described with reference to FIG. 19 and FIG. 20, in which the upper connection portions CTb are not arranged along the first direction X.

Fourth Modified Example

Figure 19:
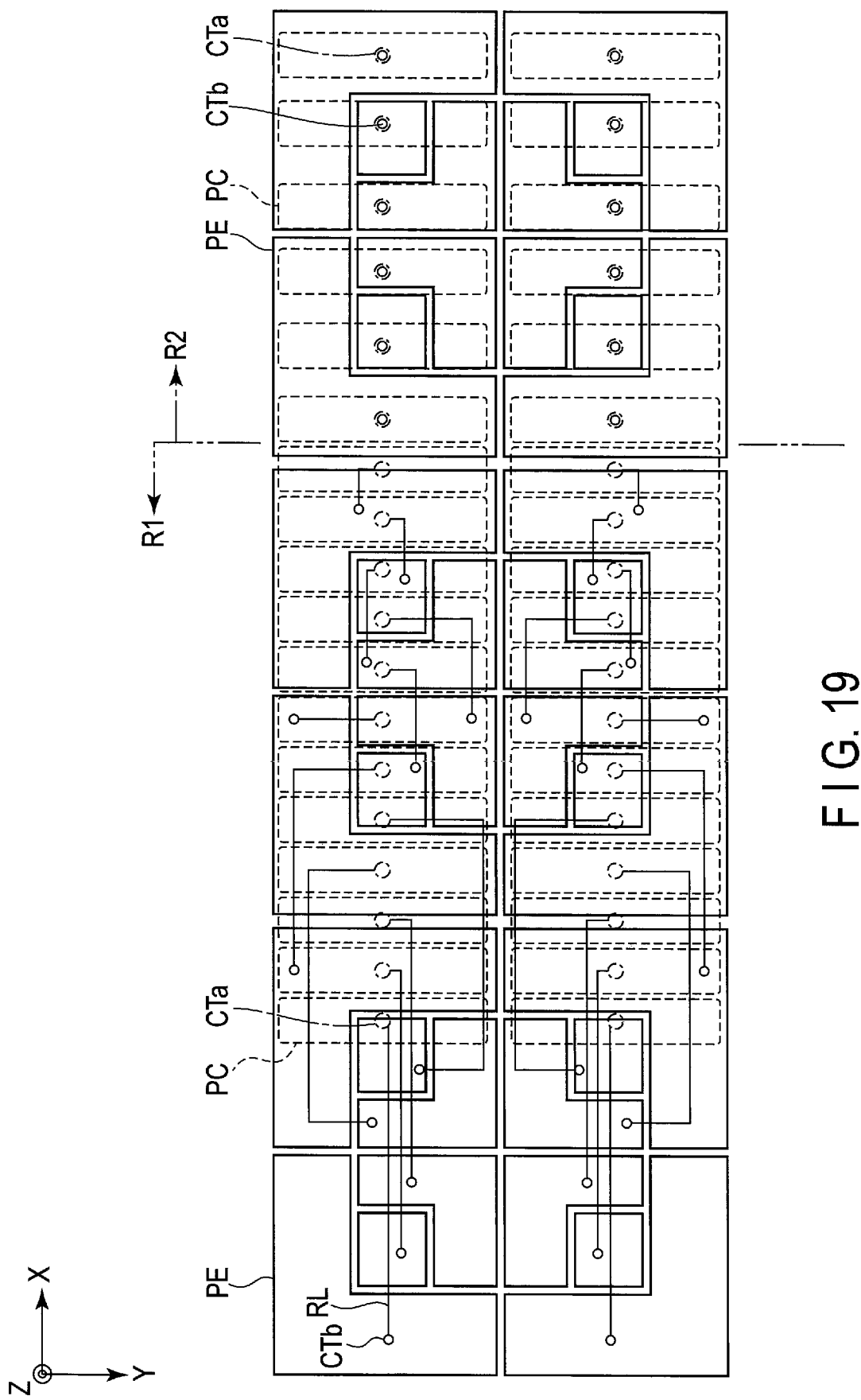
FIG. 19 is a diagram showing the second modified example of the structure of the main pixel PX and the main pixel circuit CR shown in FIG. 10.

FIG. 19 is a diagram showing the fourth modified example of the configuration of the main pixels PX and the main pixel circuits CR shown in FIG. 10.

FIG. 19 illustrates a configuration in which some of the upper connection portions CTb are not arranged along the first direction X but shifted along the second direction Y. More specifically, FIG. 19 shows a configuration example in which those of the upper connection portions CTb located in the region R1 are not arranged along the first direction X. Note that the layout of the sub-pixels in FIG. 19 is similar to that of FIG. 16.

In the modified example illustrated in FIG. 19, the relay lines RL are arranged so as to avoid interference from each other. With this modified example also, an advantageous effect similar to that of the configuration example illustrated in FIG. 10 can be obtained.

Fifth Modified Example

Figure 20:
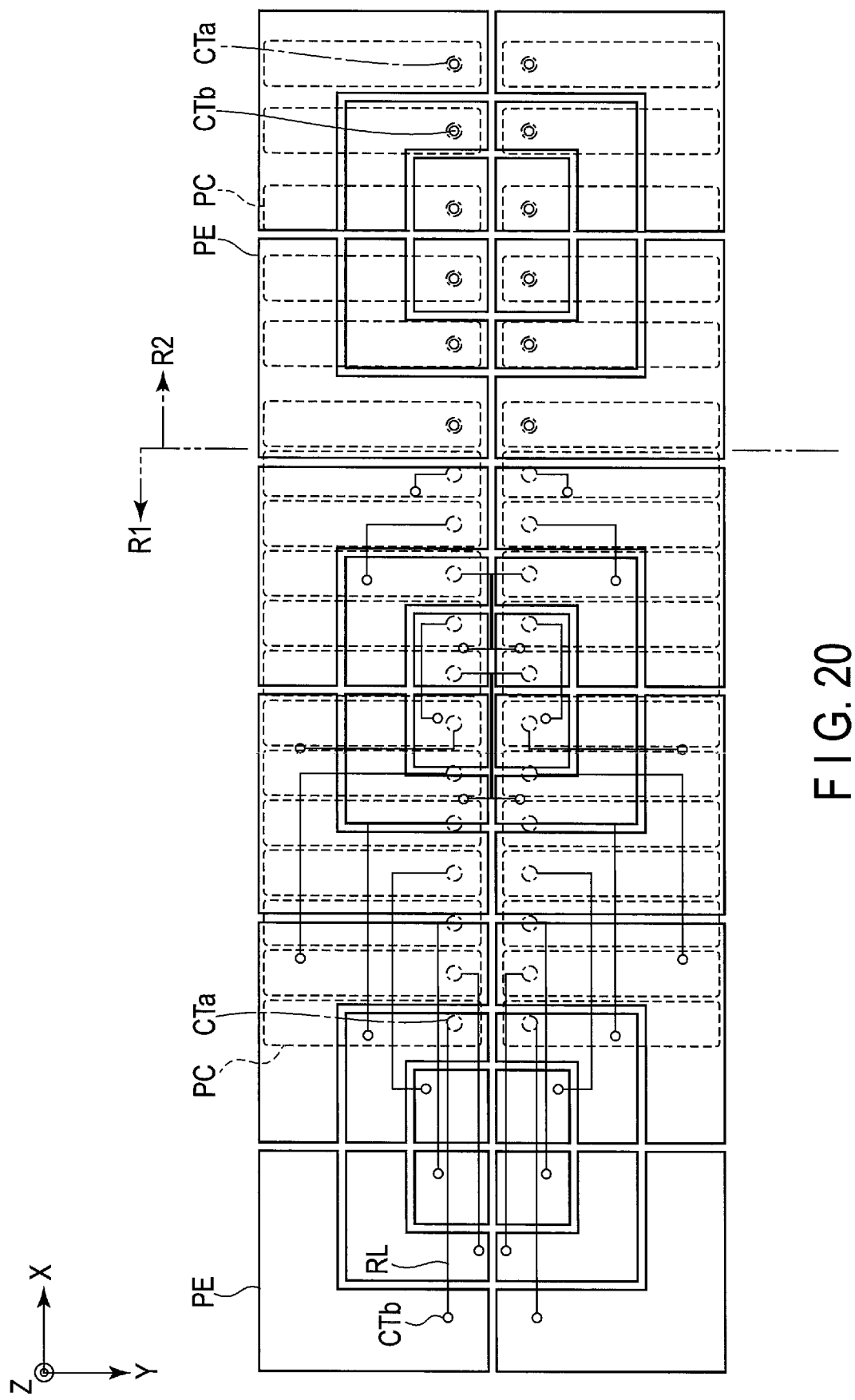
FIG. 20 is a diagram showing the third modified example of the structure of the main pixel PX and the main pixel circuit CR shown in FIG. 10.

FIG. 20 is a diagram showing the fifth modified example of the configuration of the main pixels PX and main pixel circuits CR shown in FIG. 10.

FIG. 20 illustrates a configuration in which some of the upper connection portions CTb are not arranged along the first direction X but shifted along the second direction Y. More specifically, FIG. 20 shows a configuration example in which those of the upper connection portions CTb, which are located in the region R1 are not arranged along the first direction X. Note that the layout of the sub-pixels in FIG. 19 is similar to that of FIG. 12.

In the modified example illustrated in FIG. 20, the relay lines RL are arranged so as to avoid interference from each other. With this modified example also, an advantageous effect similar to that of the configuration example illustrated in FIG. 10 can be obtained, as described above.

Sixth Modified Example

Figure 21:
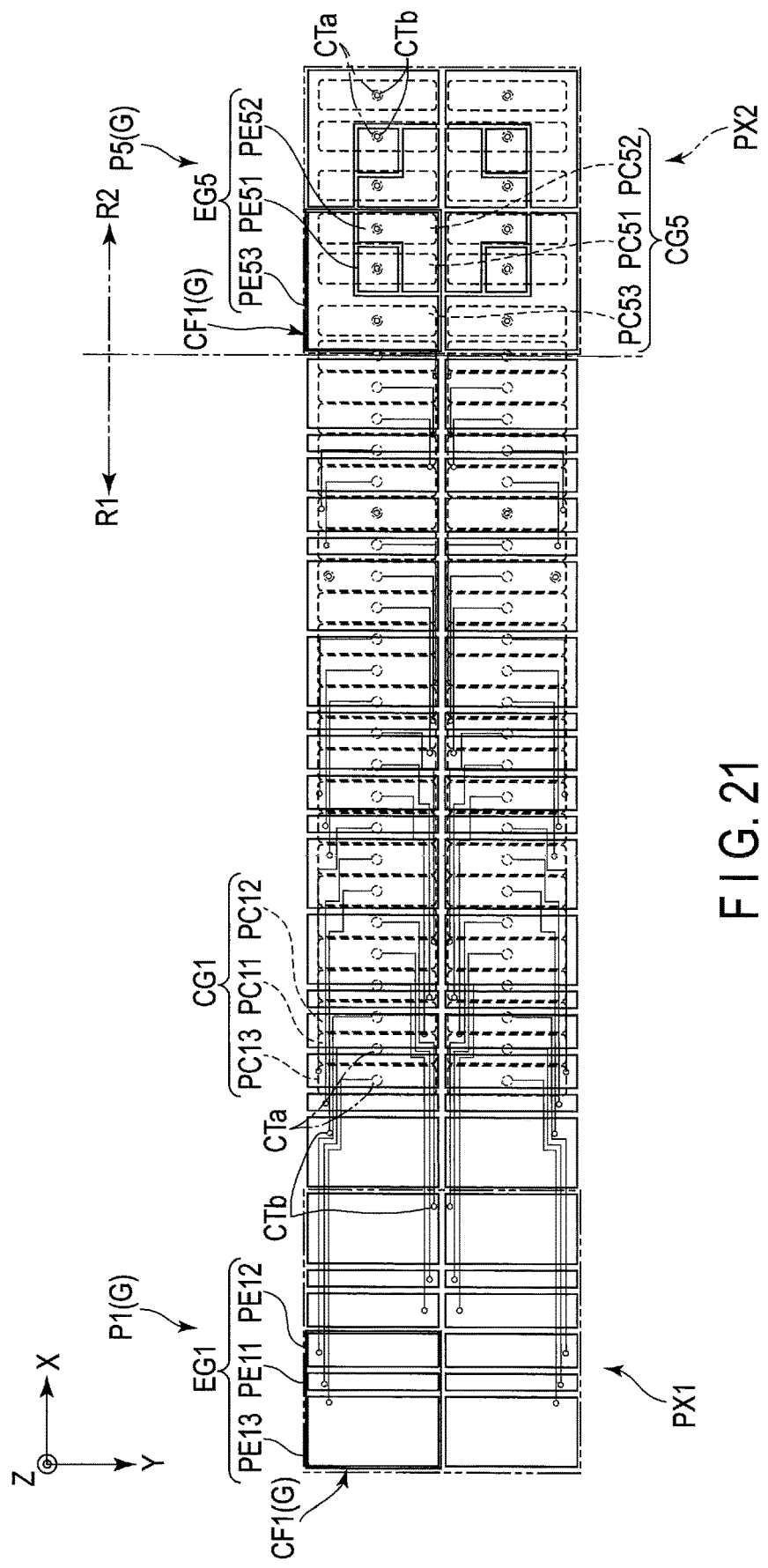
FIG. 21 is a diagram showing the fourth modified example of the structure of the main pixel PX and the main pixel circuit CR shown in FIG. 10.

FIG. 21 is a diagram showing the sixth modified example of the configuration of the main pixels PX and main pixel circuits CR shown in FIG. 10.

This modified example is different from the configuration example illustrated in FIG. 14 in that the configuration in layout of the electrode group EG5 disposed in the region R2 is a different from that of the electrode group EG1 disposed in the region R1.

The main pixels PX1 are disposed in the region R1, and the main pixels PX2 are arranged in the region R2. The main pixels PX1 and PX2 are arranged along the first direction X. The electrode group EG1 constitutes the sub-pixel P1 in the main pixel PX1. The electrode group EG5 constitutes the sub-pixel P5 in the main pixel PX5, which displays the same color as the sub-pixel P1. In the example illustrated, the sub-pixels P1 and P5 are G pixels, and both the electrode groups EG1 and EG5 respectively overlap the green color filters CF1 (G). Here, the color filter CF1 (G) are formed in regions overlapping the electrode group EG1 and the electrode group EG5, respectively so as to be integrated as one body; however, a plurality of color filters may be provided in each of the regions overlapping the electrode group EG1 and the electrode group EG5 as shown in FIG. 11.

In the example illustrated, the electrode group EG5 is laid out as illustrated in FIG. 16 and the electrode group EG1 is laid out as illustrated in FIG. 18. The pixel circuits PC51 to PC53 of the circuit group CG5 are configured to match the layout of the electrode group EG5. Therefore, the lower connection portions CTa and the upper connection portions CTb of the sub-pixel P5 are arranged in the central portion of the sub-pixel P5 along the second direction Y. The lower connection portions CTa are arranged along the first direction X from the region R1 over to the region R2, whereas the upper connection portions CTb are shifted along the second direction Y between the regions R1 and R2.

According to this modified example, the positions of the upper connection portions CTb, which correspond to the respective electrode groups EG can be changed between the regions R1 and R2. In this manner, the flexibility in the layout of the relay lines RL in the region R1 can be raised, and therefore the main pixels PX1 and the main pixel circuits CR1 can be disposed in positions respectively further from each other.

Seventh Modified Example

Figure 22:
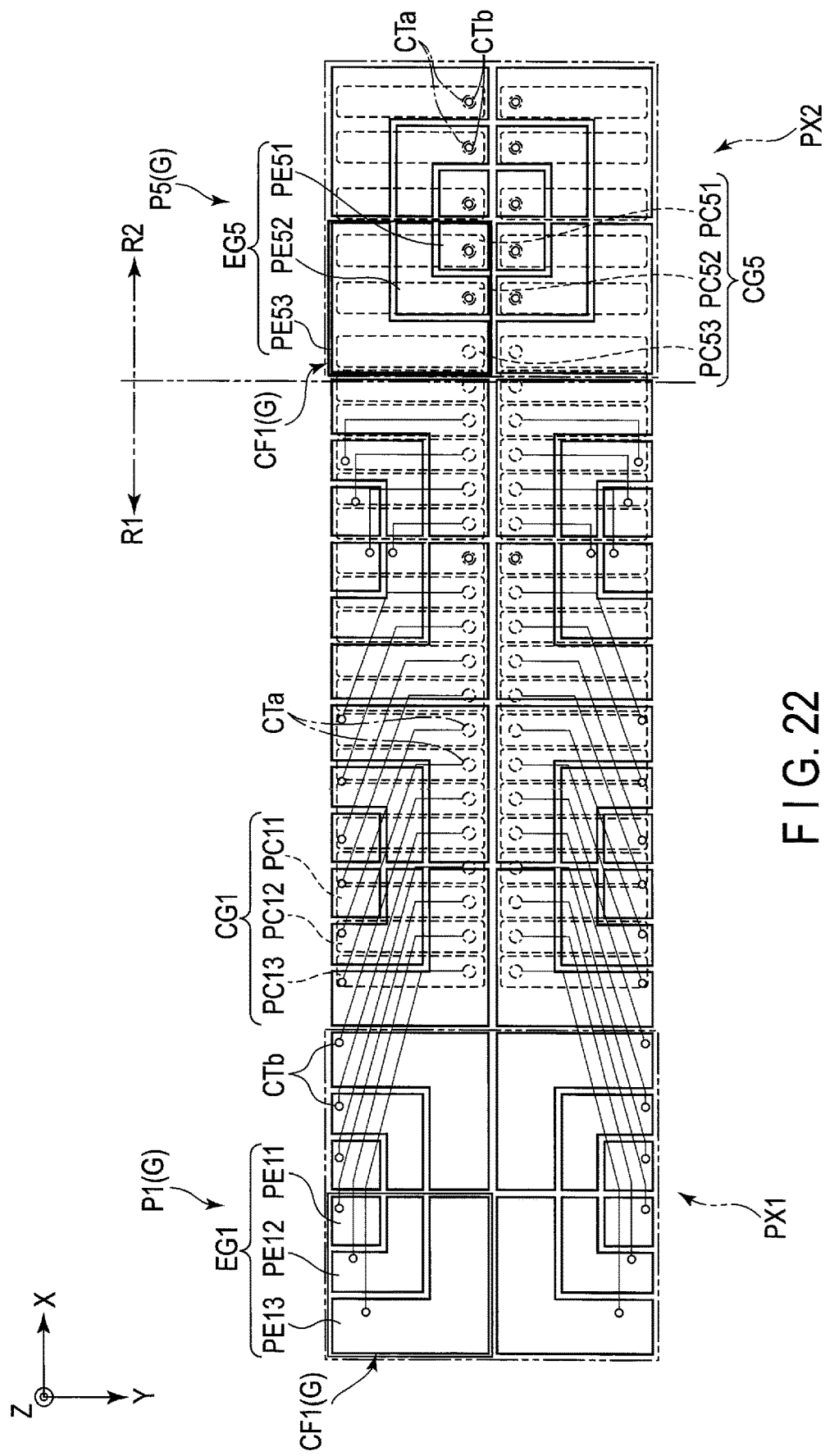
FIG. 22 is a diagram showing the fifth modified example of the structure of the main pixel PX and the main pixel circuit CR shown in FIG. 10.

FIG. 22 is a diagram showing the seventh modified example of the configuration of the main pixels PX and the main pixel circuits CR shown in FIG. 10.

As in the case of FIG. 21, this modified example illustrates a configuration in which the layouts of the electrode groups EG are different between the regions R1 and R2. In the example illustrated, the electrode group EG5 is laid out as illustrated in FIG. 12, whereas the electrode group EG1 is laid out as illustrated in FIG. 17.

In the modified example illustrated in FIG. 22, an advantageous effect similar to that discussed with FIG. 21 can be obtained.

Eighth Modified Example

Figure 23:
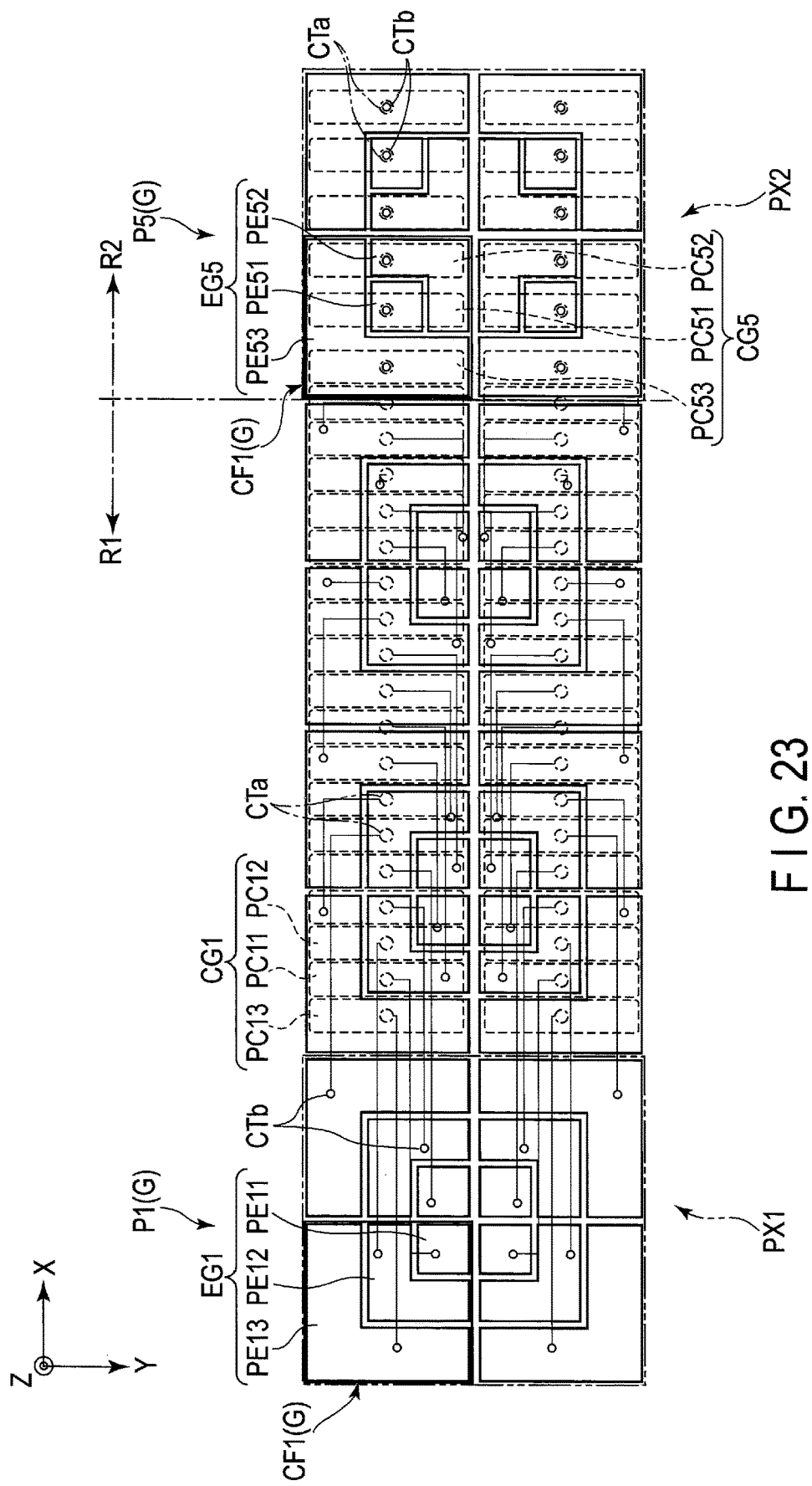
FIG. 23 is a diagram showing the sixth modified example of the structure of the main pixel PX and the main pixel circuit CR shown in FIG. 10.

FIG. 23 is a diagram showing the eighth modified example of the configuration of the main pixels PX and the main pixel circuits CR shown in FIG. 10.

As in the case of FIG. 21, this modified example illustrates a configuration in which the layouts of the electrode groups EG are different between the regions R1 and R2. In the example illustrated, the electrode group EG5 is laid out as illustrated in FIG. 16, whereas the electrode group EG1 is laid out as illustrated in FIG. 12.

In the modified example illustrated in FIG. 23, an advantageous effect similar to that discussed with FIG. 21 can be obtained.

Ninth Modified Example

Figure 24:
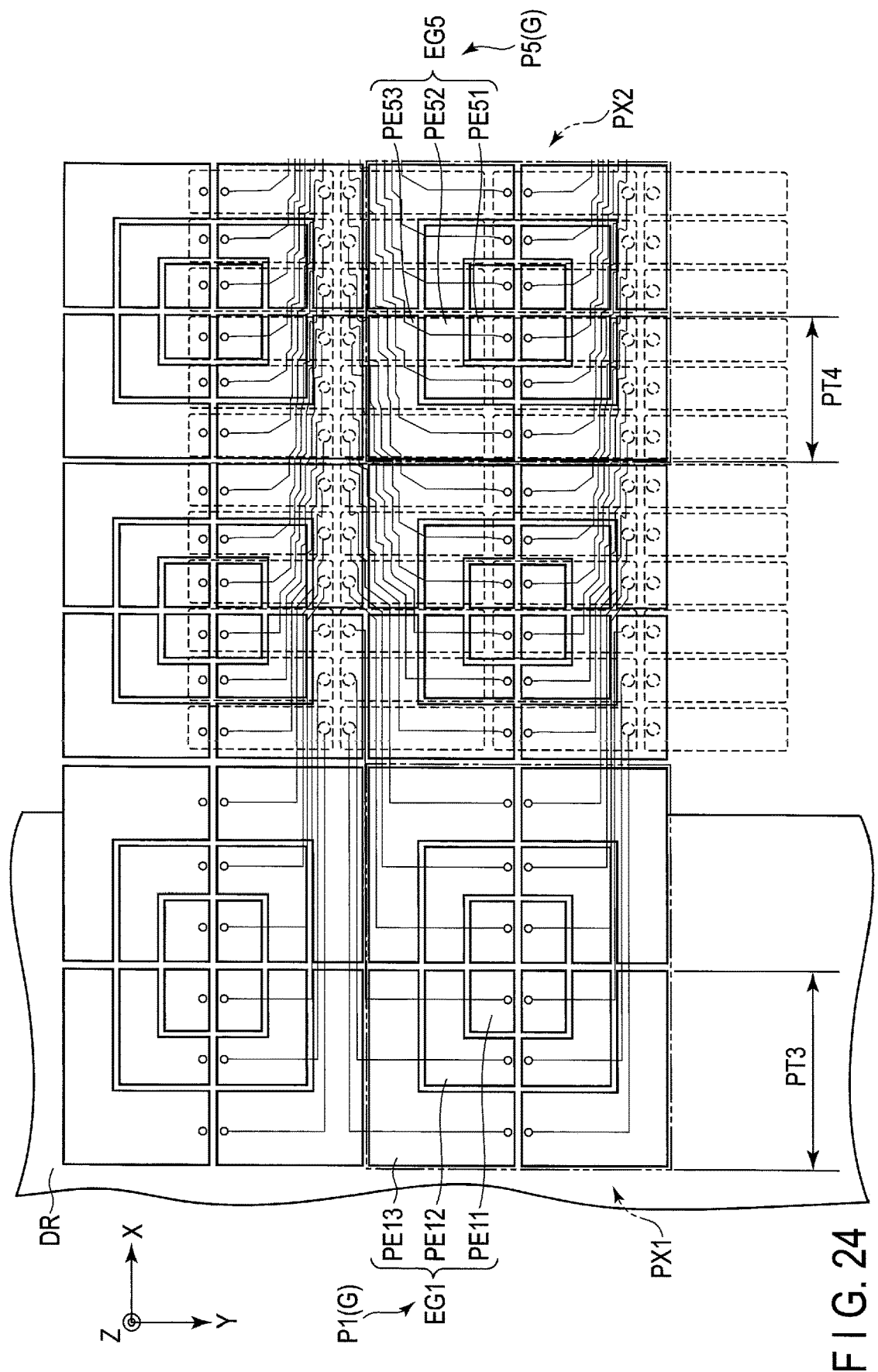
FIG. 24 is a diagram showing the seventh modified example of the structure of the main pixel PX and the main pixel circuit CR shown in FIG. 10.

FIG. 24 is a diagram showing the ninth modified example of the configuration of the main pixels PX and the main pixel circuits CR shown in FIG. 10.

This modified example is different from the configuration example illustrated in FIG. 14 in that the area of the main pixel PX1 as seen in plan view differs from that of the main pixel PX2.

When comparing the electrode group EG1 overlapping a driver DR and the electrode group EG5 disposed apart from a driver DR as seen in plan view, the widths of the electrode groups EG1 and EG5 along the second direction Y are equal to each other. Here the width of the electrode group EG1 along the first direction X is defined as a pitch PT3, and that of the electrode group EG5 along the first direction X is defined as a pitch PT4. The pitch PT3 is different from the pitch PT4 in size, and in the example, the pitch PT3 is greater than pitch PT4.

According to such a modified example, the size of the region where a driver DR and a main pixel PX overlap can be adjusted. Moreover, the number of the main pixels PX arranged so as to overlap with the drivers DR can be decreased.

Embodiment 3

This embodiment describes an example of application of the display devices DSP described in Embodiments 1 and 2.

FIG. 25 is a diagram showing a configuration example of a multi-display system.

The multi-display system illustrated here comprises a video signal output device VD and display devices DSP1 to DSP4. The video signal output device VD is connected to each of the display devices DSP1 to DSP4 via a cable. The display devices DSP1 to DSP4 are configured to be identical to the display device DSP described in any of the embodiments provided above. The display devices DSP1 to DSP4 comprise display areas DA1 to DA4 and mounting portions MT1 to MT4, respectively.

In the example illustrated, the display devices DSP1 to DSP4 are each arranged along such respective directions that the mounting portions thereof are not placed between any adjacent pair of display devices. More specifically, the display devices DSP1 and DSP2 are arranged along the first direction X, the display devices DSP3 and DSP4 are arranged along the first direction X, the display devices DSP1 and DSP3 are arranged along the second direction Y, and the display devices DSP2 and DSP4 are arranged along the second direction Y. Note that the display devices DSP1 and DSP3 are arranged so that the display areas DA1 and DA3 are located adjacent to each other and neither one of the mounting portions MT1 and MT3 is located between the display areas DA1 and DA3. Similarly, the display devices DSP2 and DSP4 are arranged so that the display areas DA2 and DA4 are located adjacent to each other. When the multi-display is assembled using the display devices DSP discussed in Embodiment 2, they should desirably arranged so that the regions R1 thereof be close to each other, that is, the outer edges DAX thereof oppose each other.

According to such a configuration example, the display areas DA1 to DA4 of the display devices DSP1 to DSP4 are located closely adjacent to each other. Further, the frame of each of the display devices DSP1 to DSP4 is narrowed as described above, thereby making it possible to reduce the gap between all adjacent pairs of display areas DA1 to DA4. Thus, the seams between the display images on the display areas DA1 to DA4 are unrecognizable in view, thus making it possible to improve the display quality.

As described above, according to this embodiment, is possible to provide a display device whose frame can be narrowed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition, examples of the display device obtained from the configurations disclosed in this specification will be a provided.

(1) A display device comprising:
a driver;
a first pixel circuit arranged apart from the driver in plan view, the first pixel circuit being electrically connected to the driver;
a second pixel circuit separated further from the driver than the first pixel circuit in plan view but electrically connected to the driver;
a first pixel electrode overlapping the driver in plan view;
a second pixel electrode overlapping the first pixel circuit in plan view;
a first relay line electrically connecting the first pixel circuit and the first pixel electrode to each other; and
a second relay line electrically connecting the second pixel circuit and the second pixel electrode to each other.

(2) The display device of the item (1), further comprising:
a first insulating film located between the first pixel circuit and the first relay line and between the second pixel circuit and the second relay line;
a second insulating film located between the first relay line and the first pixel electrode and between the second relay line and the second pixel electrode;
a first lower connection portion formed in through the first insulating film and electrically connecting the first pixel circuit and the first relay line to each other;
a first upper connection portion formed in through the second insulating film and electrically connecting the first relay line and the first pixel circuit to each other,
wherein
the first pixel electrode is disposed apart from the first pixel circuit in a first direction, and
the first lower connection portion is disposed apart from the first upper connection portion in the first direction.

(3) The display device of item (2), further comprising a second lower connection portion formed through the first insulating film and electrically connecting the second pixel circuit and the second relay line,
wherein
the first and second pixel circuits are arranged along the first direction, and
the first and second lower connection portions are arranged along the first direction.

(4) The display device of item (3), further comprising:
a third pixel circuit disposed apart from the driver further than the second pixel circuit;
a third pixel electrode overlapping the third pixel circuit in plan view and electrically connected to the third pixel circuit;
a third lower connection portion formed through the first insulating film and electrically connecting the third pixel circuit and the third pixel electrode,
wherein
the first lower connection portion is located adjacent to the other lower connection portions along the first direction at a first pitch, and
the second lower connection portion is located adjacent to the other lower connection portions along the first direction at a second pitch greater than the first pitch.

(5) The display device of item (2), further comprising:
a fourth pixel circuit disposed apart from the driver in plan view and electrically connected to the driver;

a fourth pixel electrode disposed apart from the fourth pixel circuit in a second direction crossing the first direction and overlapping the driver, in plan view; and a fourth relay line located between the first insulating film the second insulating film and electrically connecting the fourth pixel circuit and the fourth pixel electrode to each other.

(6) The display device of item (1), further comprising:

a light-shielding portion having light-shielding property, located on a same layer as the first and second relay lines and disposed apart from the first and second relay lines.

(7) A display device comprising:

a driver;

a first circuit group including first ro third pixel circuits each electrically connected to the driver, and disposed apart from the driver in plan view;

a first electrode group including a first pixel electrode, a second pixel electrode greater in area than the first pixel electrode, and a third pixel electrode greater in area than the second pixel electrode, and, the first electrode group overlapping the driver in plan view;

a first relay line electrically connecting the first pixel circuit and the first pixel electrode to each other;

a second relay line electrically connecting the second pixel circuit and the second pixel electrode to each other; and a third relay line electrically connecting the third pixel circuit and the third pixel electrode to each other.

(8) The display device of item (7), further comprising:

a first insulating film located between the first pixel circuit and the first relay line, between the second pixel circuit and the second relay line, and between the third pixel circuit and the third relay line;

a second insulating film located between the first relay line and the first pixel electrode, between the second relay line and the second pixel electrode, and between the third relay line and the third pixel electrode;

a first lower connection portion formed through the first insulating film and electrically connecting the first pixel circuit and the first relay line to each other;

a second lower connection portion formed through the first insulating film and electrically connecting the second pixel circuit and the second relay line to each other;

a third lower connection portion formed through the first insulating film and electrically connecting the third pixel circuit and the third relay line to each other;

a first upper connection portion formed in through the second insulating film and electrically connecting the first relay line and the first pixel electrode to each other;

a second upper connection portion formed in through the second insulating film and electrically connecting the second relay line and the second pixel electrode to each other;

a third upper connection portion formed in through the second insulating film and electrically connecting the third relay line and the third pixel electrode to each other, wherein the first to third pixel circuits are arranged along a first direction, the first electrode group is disposed apart from the first circuit group in the first direction in plan view, the first to third lower connection portions are arranged along in the first direction, and are separated respectively from the first to third upper connection portions also in a second direction which intersects the first direction in plan view.

(9) The display device of item (8), wherein the first to third upper connection portions are disposed in an end portion of the first electrode group along the second direction, and are arranged along the first direction.

(10) The display device of item (8), further comprising:

a second circuit group adjacent to the first circuit group along the first direction; and a third circuit group adjacent to the first circuit group along the second direction, wherein the second circuit group has a configuration in layout same as that of the first circuit group, the third circuit group has a configuration in layout symmetrical with that of the first circuit group with respect to a straight line extending in the first direction as an axis of symmetry, and the first to third lower connection portions are located in end portions of the first to third pixel circuits, respectively, which are on a side opposite to that adjacent to the third circuit group.

(11) The display device of item (7), wherein the first pixel electrode has a quadrangular shape, the second pixel electrode has an L shape arranged along two crossing sides of the first pixel electrode, and the third pixel electrode has an L shape arranged along other two sides of the first pixel electrode.

(12) The display device of item (7), wherein the first pixel electrode has a quadrangular shape, the second pixel electrode has an L shape arranged along two crossing sides of the first pixel electrode, and the third pixel electrode has an L shape arranged along other two sides of the second pixel electrode, which oppose two sides adjacent to the first pixel electrode.

(13) The display device of item (7), wherein the first to third pixel electrodes are arranged along a first direction, and each extend along a second direction crossing the first direction.

(14) The display device of item (7), further comprising:

second to fourth electrode groups belonging to a same main pixel as that of the first electrode group; and a first boundary line located between the first electrode group and the third electrode group and between the second electrode group and the fourth electrode group, wherein the third electrode group has a configuration in layout symmetrical with that of the first electrode group with respect to the first boundary line as an axis of symmetry, and the fourth electrode group has a configuration in layout symmetrical with that of the second electrode group with respect to the first boundary line as an axis of symmetry.

(15) The display device of item (7), further comprising:

second to fourth electrode groups belonging to a same main pixel as that of the first electrode group;

a second boundary line located between the first electrode group and the second electrode group and between the third electrode group and the fourth electrode group, wherein the second electrode group has a configuration in layout symmetrical with that of the first electrode group with respect to the second boundary line as an axis of symmetry, and the fourth electrode group has a configuration in layout symmetrical with that of the third electrode group with respect to the second boundary line as an axis of symmetry.

(16) The display device of item (7), further comprising:
a fifth electrode group disposed apart from the driver and overlapping a color filter of the same color as that of the first electrode group, in plan view,
wherein
the fifth electrode group has a configuration in layout different from that of the first electrode group.

(17) The display device of item (7), further comprising:
a sixth electrode group disposed apart from the driver in plan view,
wherein
the first electrode group is disposed apart from the first circuit group in a first direction in plan view, and
a width of the sixth electrode group along the first direction is different from that of the first electrode group along the first direction.

(18) The display device of item (7), wherein
the first electrode group is disposed apart from the first circuit group in a first direction and is shifted with respect to the first circuit group also in a second direction crossing the first direction in plan view.

(19) The display device of item (1), further comprising:
a first substrate; and
a second substrate disposed to oppose the first substrate,
wherein
the first substrate includes the first pixel electrode disposed thereon, and
the second substrate includes an anisotropic scattering layer disposed thereon to oppose the first pixel electrode, which scatters incident light from a specific direction.

(20) The display device of item (1), further comprising:
a first substrate; and
a second substrate disposed to oppose the first substrate,
wherein
the first substrate includes the first pixel electrode disposed thereon, and
the second substrate includes an isotropic scattering layer disposed thereon to oppose the first pixel electrode, which scatters incident light from any direction.

(21) A display device comprising:
a driver;
a first circuit group including first to third pixel circuits each electrically connected to the driver;
a first electrode group including a first pixel electrode, a second pixel electrode greater in area than the first pixel electrode, and a third pixel electrode greater in area than the second pixel electrode;
a first relay line electrically connecting the first pixel circuit and the first pixel electrode to each other;
a second relay line electrically connecting the second pixel circuit and the second pixel electrode to each other;
a third relay line electrically connecting the third pixel circuit and the third pixel electrode to each other;
a first upper connection portion electrically connecting the first relay line and the first pixel electrode to each other;
a second upper connection portion electrically connecting the second relay line and the second pixel electrode to each other;
a third upper connection portion electrically connecting the third relay line and the third pixel electrode to each other;
a first lower connection portion electrically connecting the first pixel circuit and the first relay line to each other;
a second lower connection portion electrically connecting the second pixel circuit and the second relay line to each other; and
a third lower connection portion electrically connecting the third pixel circuit and the third relay line to each other,
wherein the first to third upper connection portions are arranged in an end portion of the first electrode group.

(22) The display device of item (21), further comprising:
second to fourth electrode groups belonging to a same main pixel as that of the first electrode group;
a first boundary line located between the first electrode group and the third electrode group and between the second electrode group and the fourth electrode group,
wherein
the third electrode group has a configuration in layout symmetrical with that of the first electrode group with respect to the first boundary line as an axis of symmetry, and
the fourth electrode group has a configuration in layout symmetrical with that of the second electrode group with respect to the first boundary line as an axis of symmetry.

What is claimed is:

1. A display device comprising:
a driver;
a first pixel circuit arranged apart from the driver in a plan view, the first pixel circuit being electrically connected to the driver;
a second pixel circuit separated further from the driver than the first pixel circuit in the plan view, the second pixel circuit being electrically connected to the driver;
a first pixel electrode overlapping the driver in the plan view;
a second pixel electrode overlapping the first pixel circuit in the plan view;
a first relay line electrically connecting the first pixel circuit and the first pixel electrode to each other;
a second relay line electrically connecting the second pixel circuit and the second pixel electrode to each other; and
a dummy electrode, a part of the dummy electrode overlapping the driver.

2. The display device according to claim 1, further comprising:
a first insulating film located between the first pixel circuit and the first relay line and between the second pixel circuit and the second relay line;
a second insulating film located between the first relay line and the first pixel electrode and between the second relay line and the second pixel electrode;
a first lower connection portion extending through the first insulating film and electrically connecting the first pixel circuit and the first relay line to each other;
a first upper connection portion extending through the second insulating film and electrically connecting the first relay line and the first pixel circuit to each other,
wherein
the first pixel electrode is disposed apart from the first pixel circuit in a first direction, and
the first lower connection portion is disposed apart from the first upper connection portion in the first direction.

3. The display device according to claim 2, further comprising a second lower connection portion extending through the first insulating film and electrically connecting the second pixel circuit and the second relay line,
wherein
the first and second pixel circuits are arranged along the first direction, and
the first and second lower connection portions are arranged along the first direction.

4. The display device according to claim 3, further comprising:
a third pixel circuit disposed apart from the driver further than the second pixel circuit;

a third pixel electrode overlapping the third pixel circuit in the plan view and electrically connected to the third pixel circuit;
a third lower connection portion extending through the first insulating film and electrically connecting the third pixel circuit and the third pixel electrode,
wherein
the first lower connection portion is located adjacent to the other lower connection portions along the first direction at a first pitch, and
the second lower connection portion is located adjacent to the other lower connection portions along the first direction at a second pitch greater than the first pitch.

5. The display device according to claim 2, further comprising:
a fourth pixel circuit disposed apart from the driver in the plan view and electrically connected to the driver;
a fourth pixel electrode disposed apart from the fourth pixel circuit in a second direction crossing the first direction and overlapping the driver, in the plan view; and
a fourth relay line located between the first insulating film and the second insulating film and electrically connecting the fourth pixel circuit and the fourth pixel electrode to each other.

6. The display device according to claim 1, further comprising:
a light-shielding portion having a light-shielding property, located on a same layer as the first and second relay lines and disposed apart from the first and second relay lines.

7. The display device according to claim 1, further comprising:
a first substrate; and
a second substrate disposed to oppose the first substrate, wherein
the first substrate includes the first pixel electrode disposed thereon, and
the second substrate includes an isotropic scattering layer disposed thereon to oppose the first pixel electrode, which scatters incident light from any direction.

8. A display device comprising:
a driver;
a first circuit group including first to third pixel circuits each electrically connected to the driver, and disposed apart from the driver in a plan view;
a first electrode group including a first pixel electrode, a second pixel electrode greater in area than the first pixel electrode, and a third pixel electrode greater in area than the second pixel electrode, the first electrode group overlapping the driver in the plan view;
a first relay line electrically connecting the first pixel circuit and the first pixel electrode to each other;
a second relay line electrically connecting the second pixel circuit and the second pixel electrode to each other; and
a third relay line electrically connecting the third pixel circuit and the third pixel electrode to each other, wherein
the first to third pixel electrodes oppose each other via a light-shielding layer.

9. The display device according to claim 8, further comprising:
a first insulating film located between the first pixel circuit and the first relay line, between the second pixel circuit and the second relay line, and between the third pixel circuit and the third relay line;
a second insulating film located between the first relay line and the first pixel electrode, between the second relay line and the second pixel electrode, and between the third relay line and the third pixel electrode;
a first lower connection portion extending through the first insulating film and electrically connecting the first pixel circuit and the first relay line to each other;
a second lower connection portion extending through the first insulating film and electrically connecting the second pixel circuit and the second relay line to each other;
a third lower connection portion extending through the first insulating film and electrically connecting the third pixel circuit and the third relay line to each other;
a first upper connection portion extending through the second insulating film and electrically connecting the first relay line and the first pixel electrode to each other;
a second upper connection portion extending through the second insulating film and electrically connecting the second relay line and the second pixel electrode to each other; and
a third upper connection portion extending through the second insulating film and electrically connecting the third relay line and the third pixel electrode to each other,
wherein
the first to third pixel circuits are arranged along a first direction,
the first electrode group is disposed apart from the first circuit group in the first direction in the plan view,
the first to third lower connection portions are arranged along the first direction, and are separated respectively from the first to third upper connection portions also in a second direction which intersects the first direction in the plan view.

10. The display device according to claim 9, wherein
the first to third upper connection portions are disposed in an end portion of the first electrode group along the second direction, and are arranged along the first direction.

11. The display device according to claim 9, further comprising:
a second circuit group adjacent to the first circuit group along the first direction; and
a third circuit group adjacent to the first circuit group along the second direction,
wherein
the second circuit group has a configuration in layout same as that of the first circuit group,
the third circuit group has a configuration in layout symmetrical with that of the first circuit group with respect to a straight line extending in the first direction as an axis of symmetry, and
the first to third lower connection portions are located in end portions of the first to third pixel circuits, respectively, which are on a side opposite to that adjacent to the third circuit group.

12. The display device according to claim 7, wherein
the first pixel electrode has a quadrangular shape,
the second pixel electrode has an L shape arranged along two crossing sides of the first pixel electrode, and
the third pixel electrode has an L shape arranged along other two sides of the first pixel electrode.

13. The display device according to claim 7, wherein
the first pixel electrode has a quadrangular shape,
the second pixel electrode has an L shape arranged along two crossing sides of the first pixel electrode, and the third pixel electrode has an L shape arranged along other two sides of the second pixel electrode, which oppose two sides adjacent to the first pixel electrode.

14. The display device according to claim 7, wherein
the first to third pixel electrodes are arranged along a first direction, and each extend along a second direction crossing the first direction.

15. The display device according to claim 7, further comprising:
second to fourth electrode groups belonging to a same main pixel as that of the first electrode group; and
a first boundary line located between the first electrode group and the third electrode group and between the second electrode group and the fourth electrode group, wherein
the third electrode group has a configuration in layout symmetrical with that of the first electrode group with respect to the first boundary line as an axis of symmetry, and
the fourth electrode group has a configuration in layout symmetrical with that of the second electrode group with respect to the first boundary line as an axis of symmetry.

16. The display device according to claim 7, further comprising:
second to fourth electrode groups belonging to a same main pixel as that of the first electrode group;
a second boundary line located between the first electrode group and the second electrode group and between the third electrode group and the fourth electrode group, wherein
the second electrode group has a configuration in layout symmetrical with that of the first electrode group with respect to the second boundary line as an axis of symmetry, and
the fourth electrode group has a configuration in layout symmetrical with that of the third electrode group with respect to the second boundary line as an axis of symmetry.

17. The display device according to claim 7, further comprising:
a fifth electrode group disposed apart from the driver and overlapping a color filter of the same color as that of the first electrode group, in the plan view, wherein
the fifth electrode group has a configuration in layout different from that of the first electrode group.

18. The display device according to claim 7, further comprising:
a sixth electrode group disposed apart from the driver in the plan view, wherein
the first electrode group is disposed apart from the first circuit group in a first direction in the plan view, and
a width of the sixth electrode group along the first direction is different from that of the first electrode group along the first direction.

19. The display device according to claim 7, wherein
the first electrode group is disposed apart from the first circuit group in a first direction and is shifted with respect to the first circuit group also in a second direction crossing the first direction in the plan view.

20. The display device according to claim 1, further comprising:
a first substrate; and
a second substrate disposed to oppose the first substrate, wherein
the first substrate includes the first pixel electrode disposed thereon, and
the second substrate includes an anisotropic scattering layer disposed thereon to oppose the first pixel electrode, which scatters incident light from a specific direction.

* * * * *